(12) United States Patent
Ziv et al.

(10) Patent No.: US 11,747,966 B2
(45) Date of Patent: Sep. 5, 2023

(54) DETECTING PASTE AND OTHER TYPES OF USER ACTIVITIES IN COMPUTER ENVIRONMENT

(71) Applicant: Proofpoint, Inc., Sunnyvale, CA (US)

(72) Inventors: Guy Ziv, Holon (IL); Doron Seijffers, Avichail (IL); Nir Barak, Karmei Yosef (IL); Lior Tal, Tel Aviv (IL)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

(21) Appl. No.: 17/419,469

(22) PCT Filed: Jan. 3, 2020

(86) PCT No.: PCT/US2020/012133
§ 371 (c)(1),
(2) Date: Jun. 29, 2021

(87) PCT Pub. No.: WO2020/142654
PCT Pub. Date: Jul. 9, 2020

(65) Prior Publication Data
US 2022/0075492 A1   Mar. 10, 2022

Related U.S. Application Data

(60) Provisional application No. 62/788,273, filed on Jan. 4, 2019.

(51) Int. Cl.
*G06F 3/0484* (2022.01)
*G06F 3/0482* (2013.01)
*G06F 3/0489* (2022.01)

(52) U.S. Cl.
CPC .......... *G06F 3/0484* (2013.01); *G06F 3/0482* (2013.01); *G06F 3/0489* (2013.01)

(58) Field of Classification Search
CPC . G06F 2203/04101; G06F 2203/04806; G06F 2203/04808; G06F 3/017;
(Continued)

(56) References Cited

U.S. PATENT DOCUMENTS 8,843,820 B1 * 9/2014 Kay ........................ G06F 21/51
715/234
2001/0018715 A1   8/2001 Stern et al.
(Continued)

OTHER PUBLICATIONS

International Search Report dated May 7, 2020 for PCT/US20/12133.
European Search Report dated Sep. 1, 2022 for 20735938.1.

*Primary Examiner* — Rayeez R Chowdhury
(74) *Attorney, Agent, or Firm* — Sheehan Phinney Bass & Green PA

(57) ABSTRACT

A computer-based method includes: receiving an indication from a computer's operating system that a user has performed a first action that may have caused a context menu with a paste option to open on a screen of the computer, and subsequently receiving an indication from the computer's operating system that the user has performed a second action at the computer that may have amounted to a selection of the paste option on the context menu. In response to the indication from the computer's operating system that the user has performed the second action, the method includes determining if the second action by the user amounted to a selection of the paste option on the context menu and thereby cause a paste action to occur.

29 Claims, 29 Drawing Sheets

(58) Field of Classification Search
CPC .. G06F 3/04883; G06F 16/353; G06F 21/552; G06F 21/6209; G06F 2221/034; G06F 2221/2111; G06F 3/0482; G06F 1/00; G06F 1/02; G06F 1/04; G06F 1/16; G06F 1/22; G06F 1/24; G06F 21/554; G06F 3/00; G06F 5/00; G06F 7/00; G06F 15/00
See application file for complete search history.

(56) References Cited

U.S. PATENT DOCUMENTS

| | | |
|---|---|---|
| 2004/0070629 A1 | 4/2004 | Seifert |
| 2006/0184540 A1* | 8/2006 | Kung ................... G06F 16/188 |
| 2007/0106939 A1* | 5/2007 | Qassoudi .............. G06F 3/0486 |
| | | 715/704 |
| 2008/0090659 A1 | 4/2008 | Aguilar et al. |
| 2011/0214503 A1 | 9/2011 | Scott et al. |
| 2011/0225650 A1* | 9/2011 | Margolies .............. G06Q 10/06 |
| | | 726/22 |
| 2013/0238744 A1* | 9/2013 | Paschke ................. G06F 9/543 |
| | | 709/216 |
| 2014/0011547 A1* | 1/2014 | Jingushi ............... H04B 1/3827 |
| | | 455/566 |
| 2014/0012324 A1 | 1/2014 | Beveridge |
| 2014/0013234 A1* | 1/2014 | Beveridge .............. G06F 9/452 |
| | | 715/740 |
| 2015/0143534 A1 | 5/2015 | Bowles |
| 2015/0205957 A1* | 7/2015 | Turgeman ............ G06F 21/554 |
| | | 726/23 |
| 2016/0004853 A1 | 1/2016 | Boodaei et al. |
| 2016/0196674 A1 | 7/2016 | Ruble et al. |
| 2016/0380931 A1* | 12/2016 | Sircar ................... H04L 51/063 |
| | | 709/206 |
| 2017/0154188 A1* | 6/2017 | Meier .................. G06F 21/552 |
| 2022/0137787 A1* | 5/2022 | Tai ........................ G06F 3/0346 |
| | | 715/764 |

* cited by examiner

| Time | | Event |
|---|---|---|
| 10:52:07 AM | Mail | Inbox — nbarak@proofpoint.com (251 messages - Connection Logging Enabled) |
| 10:52:09 AM | | New Message |
| 10:52:23 AM | | v |
| 10:52:24 AM | | very imp |
| 10:52:25 AM | | very important |
| 10:52:28 AM | | Paste of the files/folders temp1.txt from /Users/nirbarak/Downloads in very important |
| 10:52:29 AM | | very important |
| 10:52:31 AM | | Attached to email "temp1.txt" |
| 10:52:31 AM | 104.130.219.150 | ObserveIT - Alerts |

| Time | Source | Window |
|---|---|---|
| 8:13:47 AM | WarningNotification | Window |
| 8:13:49 AM | mail.google.com | 0321 דואר - nirbarak68@gmail.com - Gmail - Google Chrome |
| 8:13:51 AM | WarningNotification | Window |
| 8:13:52 AM | mail.google.com | WarningNotification - closing... |
| 8:13:54 AM | | 0321 דואר - nirbarak68@gmail.com - Gmail - Google Chrome |
| 8:13:56 AM | 10.3.0.57 | ObserveIT - Configuration - Alert & Prevent Rules - Google Chrome |
| 8:14:00 AM | Microsoft Word | Document1 |
| 8:14:18 AM | 10.3.0.57 | Microsoft Word - no window |
| 8:14:20 AM | | Microsoft Word - no window |
| 8:14:20 AM | | ObserveIT - Configuration - Alert & Prevent Rules - Google Chrome |
| 8:14:22 AM | mail.google.com | 0321 דואר - nirbarak68@gmail.com - Gmail - Google Chrome |
| 8:14:45 AM | | ⊕ Paste of the text<br>More sensitive ObserveIT Data<br>in 0321 דואר - nirbarak68@gmail.com - Gmail - Google Chrome |
| 8:14:46 AM | | 0321 דואר - nirbarak68@gmail.com - Gmail - Google Chrome |
| 8:14:58 AM | | WarningNotification - window title unavailable |
| 8:14:58 AM | | WarningNotification - closing... |
| 8:14:59 AM | 10.3.0.57 | 0321 דואר - nirbarak68@gmail.com - Gmail - Google Chrome |
| 8:15:00 AM | | ObserveIT - Configuration - Admin Dashboard - Google Chrome |
| 8:15:06 AM | | ObserveIT - Alerts - Google Chrome |
| 8:15:23 AM | | |
| 8:15:24 AM | | ObserveIT - Configuration - Alert & Prevent Rules - Google Chrome |
| 8:15:27 AM | | ObserveIT - Configuration - Alert & Prevent Rules - Google Chrome |
| 8:15:37 AM | | ObserveIT - Configuration - Alert & Prevent Rules - Edit Alert Rule - Google Chrome |
| 8:15:59 AM | | |
| 8:16:05 AM | | ObserveIT - Configuration - Alert & Prevent Rules - Edit Alert Rule - Google Chrome |
| 8:16:40 AM | | ObserveIT - User Diary - Activities - Google Chrome |

Activity can also be seen as part of the session activity in activity chronological view

DETECTING PASTE AND OTHER TYPES OF USER ACTIVITIES IN COMPUTER ENVIRONMENT

CROSS-REFERENCE TO RELATED APPLICATIONS

This application is a national phase entry of PCT Application PCT/US20/12133, entitled Detecting Paste And Other Types Of User Activities In Computer Environment, which was filed Jan. 3, 2020 and claims the benefit of priority to U.S. Provisional Patent Application No. 62/788,273, entitled Light, Holistic and Efficient Paste detection, data, activity and correlations, which was filed on Jan. 4, 2019. The disclosure of the prior application are incorporated by reference herein in their entirety.

FIELD OF THE INVENTION

This disclosure relates to the field of detecting certain user activities, such as paste, in a computer-based environment and, more particularly, relates to computer-based systems and techniques for making those kinds of detections.

BACKGROUND

Companies and other organizations have an interest in monitoring user behavior/activities on their computer systems and protecting data (e.g., text, images, etc.) that may be stored on their computer systems. Protecting data is especially important for confidential data and any other types of data that might derive value from being not generally available to the public.

There are a variety of ways that these sorts of interests might be compromised. For example, a company's own employees might take steps to try to move sensitive data from one place (e.g., inside a confidential document) to another (e.g., inside an email). In a computer parlance, the terms "cut," "copy," and "paste" refer to commands that enable users to move data in this manner. In general, a cut command removes selected data from its original position, whereas a copy command creates a duplicate of the selected data. In both cases the selected data is placed into a temporary storage location (e.g., a clipboard). The data from the clipboard can be later inserted whenever and wherever a paste command is executed. Each cut or copy typically overwrites previous clipboard content. Moreover, content generally remains available in the clipboard for further pasting following a paste operation.

Since companies and other organizations have an interest in protecting data in their computer systems, and since moving data (e.g., by cut, copy and paste) poses a risk to that interest, system administrators may wish to monitor those kinds of data movements.

SUMMARY OF THE INVENTION

In one aspect, a computer-based method includes: receiving an indication from a computer's operating system that a user has performed a first action that may have caused a context menu with a paste option to open on a screen of the computer, and subsequently receiving an indication from the computer's operating system that the user has performed a second action at the computer that may have amounted to a selection of the paste option on the context menu. In response to the indication from the computer's operating system that the user has performed the second action, the method includes determining if the second action by the user did amount to a selection of the paste option on the context menu and thereby cause a paste action to occur.

In another aspect, a computer system includes: a monitor application server and a computer connected to the monitor application server via a network connection. The computer has a keyboard, a computer mouse, a screen, an operating system, and a computer-based agent. The computer-based agent can receive an indication from the operating system that a user has performed a first action with the mouse that may have caused a context menu with a paste option to open on the screen. The first action with the mouse can be a right mouse click or some other mouse click that the computer responds to by opening the context menu. The computer-based agent can subsequently receive an indication from the operating system that the user has performed a second action with the mouse that may have amounted to a selection of the paste option on the context menu. The second action with the mouse can be a left mouse click or some other mouse click that will select an option on the context menu if an on-screen pointer or mouse cursor is positioned within an on-screen boundary for that option at the time of the click. In response to the indication from the computer's operating system that the user has performed the second action with the mouse, the computer-based agent can determine if the second action with the mouse did amount to an actual selection of the paste option on the context menu and thereby cause a paste action to occur.

In yet another aspect, a computer-based method is disclosed for determining whether a user at a computer has used a mouse to select a particular option from an on-screen context menu. The computer-based method includes obtaining a handle for an in-focus window (e.g., an on-screen context menu) at the computer from a user interface of the computer, and using the handle to request information about the in-focus window from an accessibility application programming interface (API) on the computer. The in-focus window, in this regard, is an on-screen context menu and the information about the context menu may include information about one or more options available at the on-screen context menu and on-screen location information for those one or more options.

A computer-based method includes receiving an indication from a computer's operating system that a user has performed a keyboard action at a computer that included one or more key presses on a keyboard that caused the computer to perform a keyboard-initiated paste action, and comparing the one or more key presses against a list of key presses and/or key press combinations (stored in a computer-based data store, that, if pressed, would cause the computer to perform the keyboard-initiated paste action). If the one or more keys pressed match an entry in the list of key presses and/or key press combinations, the method includes concluding that the keyboard action by the user caused the keyboard-initiated paste action to occur; and creating a notification of the keyboard-initiated paste action.

In some implementations, one or more of the following advantages are present.

For example, in some implementations, systems and techniques are provided to track and monitor user pasting activities in a computer network environment. These systems and techniques can be used to detect, minimize and thwart data exfiltration attempts by insiders (e.g., a company's own employees).

In some implementations, the system administrator can set up filters to be notified of only certain types of paste activities (e.g., paste activities by a certain user, paste activities to a certain destination or type of destination, paste activities during a particular period of time, etc.). Notifications can be provided to the system administrator with varying degrees of information about the pasting activity. Various details such as what was pasted, who performed the paste, in what process (e.g., mail, etc.), on which computer, from which client, when the paste occurred, etc. can be provided with a notification, placing the paste activity into a context that allows the system administrator to understand the potential significance of the pasting activity in context.

The techniques disclosed here amount to very light detection processes. The associated mechanisms are not intrusive, have very low stability risk for the applications involved, and do not generally suffer from any compatibility issues.

The systems and techniques disclosed herein support both keyboard-based paste commands and mouse-based paste commands. Any paste actions can be processed as part of a user session and correlated with other user actions in the session, including the option for capturing a screenshot immediately following the paste activity.

The relatively non-intrusive nature of the approaches disclosed herein provide for both concealment and an encapsulated solution, that runs silently in the background and is not involved in other process implementations.

Moreover, the systems and techniques disclosed herein open the door for preliminary investigation immediately following a paste action thereby facilitating an accurate and fast response to the paste action.

In a typical implementation, the systems and techniques disclosed herein facilitate flexible control over the paste action detection together with rich configurations and settings options on the way the detectors should behave makes the algorithms very elastic and generic.

Collecting the clipboard content is performed in the background, and the mechanism for doing so is fast.

Caching can allow catching more information like on a copy action, so a paste event can be enriched with more information like from what application the data came.

A system administrator, for example, can be alerted, search or correlate actions based on both a paste action and information around it including data pasted, data type, process, app, user, session information and even information on the app used in the copy event.

Other features and advantages will be apparent from the description and drawings, and from the claims.

BRIEF DESCRIPTION OF THE DRAWINGS

FIG. 4 shows a screenshot with an example of how a notification that a user performed a paste operation might be presented to a system administrator.

FIG. 5 shows a screenshot with an example of how a more detailed notification that a user performed a paste operation might be presented to a system administrator.

Like reference characters refer to like elements.

DETAILED DESCRIPTION

Figure 1:
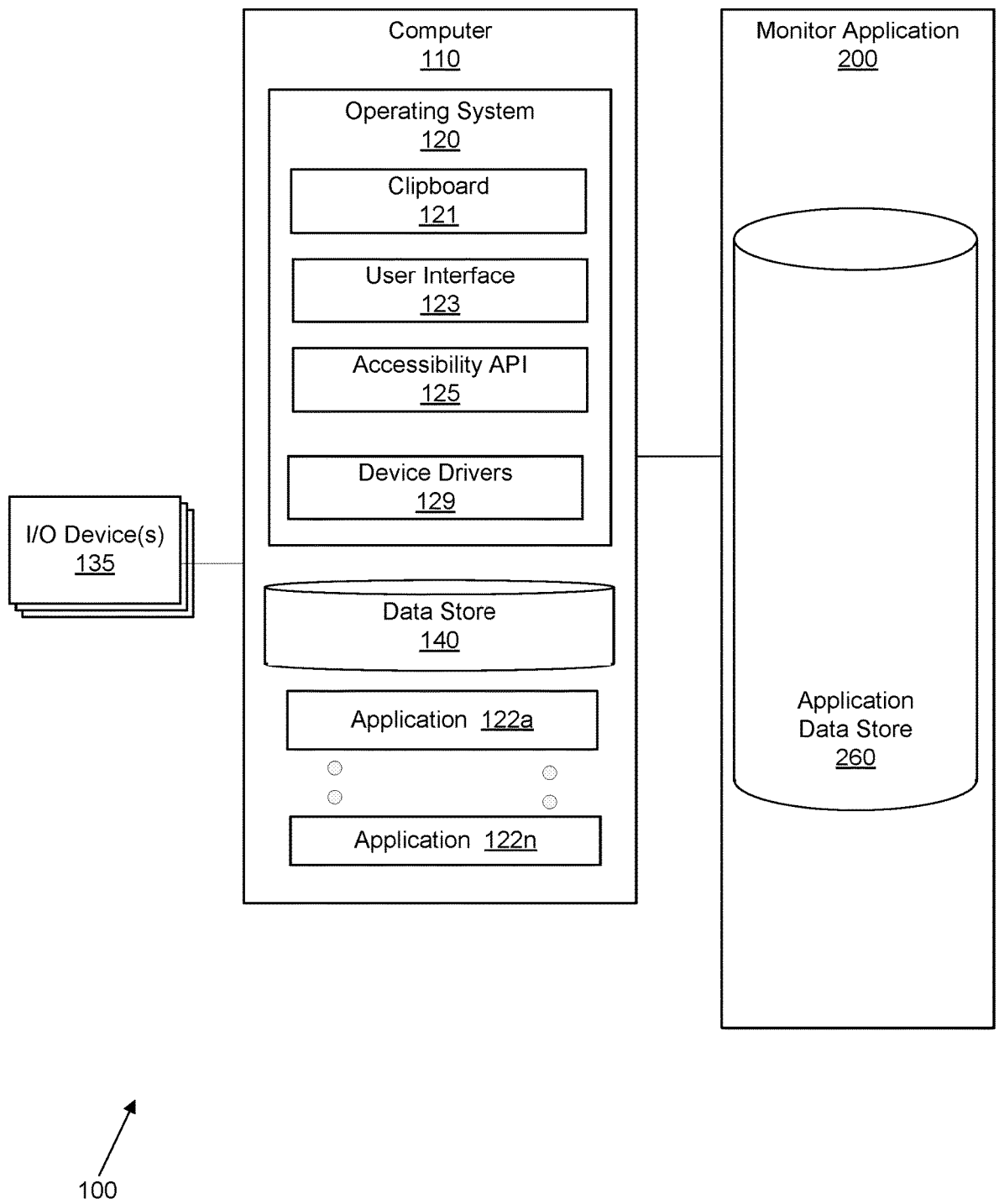
FIG. 1 is a schematic representation showing an example of a computer system that is configured to monitor certain user activities at a computer.

There are several ways that a user can move data (e.g., text, images, etc.) from one place to another within a computer system. In one example, the user selects the data to be moved, cuts or copies the selected data, and then pastes the data to the new location. The data can be moved from one place to another within the same document, from one document to another document, or from one application program to another application program.

There are typically several different ways that a user might access the cut, copy, and paste functionalities, including by interacting with a computer's keyboard, mouse, or some combination thereof.

According to one example, the user might use the keyboard to copy a selected section of data by pressing [Cntrl]+[c] on the keyboard of a computer to copy the selected data, locating an insertion point cursor at a desired pasting location, and then pressing [Cntrl]+[v] on the keyboard to paste the copied data. Alternatively, the user might move a selected section of data by pressing [Cntl]+[x] to cut the selected data, locating the insertion point cursor at a desired pasting location, and then pressing [Cntl]+[v] to paste the cut data.

According to another example, the user might use the mouse to copy a selected section of data in a computer system by positioning the mouse cursor over the selected data, right clicking the mouse to access an on-screen context menu, moving the mouse cursor over the context menu to the Copy option of the context menu, left clicking the Copy option to copy, moving the mouse cursor to a desired paste location, right clicking the mouse to again access the on-screen context menu, moving the mouse cursor over the context menu to the Paste option of the context menu, and then left clicking the Paste option of the context menu to paste the copied data.

According to another example, the user might use the mouse to move a selected section of data in a computer system by positioning the mouse cursor over the selected data, right clicking the mouse to access an on-screen context menu, moving the mouse cursor over the context menu to the Cut option of the context menu, left clicking the Cut option to cut the selected data, moving the mouse cursor to a desired paste location, right clicking the mouse to again access an on-screen context menu, moving the mouse cursor over the context menu to the Paste option of the context menu and then left click the Paste option of the context menu.

Of course, a user might move selected data use some combination of keyboard and mouse interactions. For example, the user might press [Cntrl]+[c] on the keyboard to copy the selected data, locate the insertion point cursor at a desired pasting location, right click the mouse to access an on-screen context menu, and then left click the Paste option of the context menu. Alternatively, the user might move selected data by positioning the mouse cursor over the selected data, right clicking the mouse to access an on-screen context menu, left clicking the Cut option on the context menu, locating the insertion point cursor at a desired pasting location, and then pressing [Cntl]+[v] to paste the cut data.

Thus, there are a variety of ways that a user might move selected data from one place to another. Regardless of which of these methods is utilized, it may desirable to monitor such data movements and provide notifications of the data movements (e.g., utilizing the paste functionality) when at least some of these movements happen. Notably, a move is generally not complete unless and until the pasting action has occurred.

FIG. 1 is a schematic representation showing an example of a computer system 100 that is configured to monitor certain activities at computer 110, including whether a user has interacted with the computer 110 (e.g., using the mouse or the keyboard) in a manner that might have related to or involved a possible movement of data from one place to another within the computer system 100.

In some implementations, the system 100 monitors users' interactions within the system (e.g., through key presses, mouse clicks, etc.) to determine whether a paste has occurred (possibly signifying the movement of data within the system). The system is generally configured to identify those pastes and provide notifications and information about the pastes to a system administrator. In some implementations, the system 100 collects other related information (e.g., screenshots, user session information, application information, etc.) and determines who performed the paste, in what process (e.g., mail, etc.), on which computer, from which client, when the paste occurred, etc. to give the system administrator more contextual intelligence about any reported paste activities.

The computer system 100 has a computer 110, with a plurality of input/output (I/O) devices, and a monitor application 200. The computer 110 has an operating system 120, a plurality of software applications 122a . . . 122n, and a data store 140.

The operating system 120 in the computer 110 has a clipboard 121, a user interface 123, an accessibility application programming interface (API) 125, and device drivers 129. The clipboard 121 can be any kind of computer-based memory buffer that provides for short-term storage and transfer of data (e.g., text, images, etc.) within and between application programs. In a Windows-based environment, the clipboard is referred to as a clipboard. In other types of environments, the clipboard might be referred to as a pasteboard (e.g. on MAC) or something else. The device drivers 129 support external devices, for example I/O devices 135 (such as a mouse, trackpad, keyboard, external USB storage devices 135, for example, hard drives, flash drives, SSD drives, and the like). The accessibility API 125 is a computer-based infrastructure that gives the monitor application 200 access to a great deal of information about any applications (e.g., 122a . . . 122n) running on the computer 110. In some implementations, the accessibility API 125 may be a built-in OS Accessibility API. On a MAC, the accessibility functionalities can be accessed using functions like AXUIElementCreatApplication and other similar functions. The data store 140 indicates one or more storage devices whose access is controlled by the computer 110, for example, hard drives, solid state drives, tape drives, optical drives, and the like.

The monitor application 200 is in communication with the computer 110. In some embodiments, the monitor application may be resident on the computer 110. In other embodiments, the monitor application may be hosted in one or more external computing devices, such as a server (not shown in FIG. 1) in communication with the computer 110, for example via a wired or wireless network connection. The monitor application 200 has an application data store 260 for data used by the monitor application 200, for example, application state data.

Figure 2:
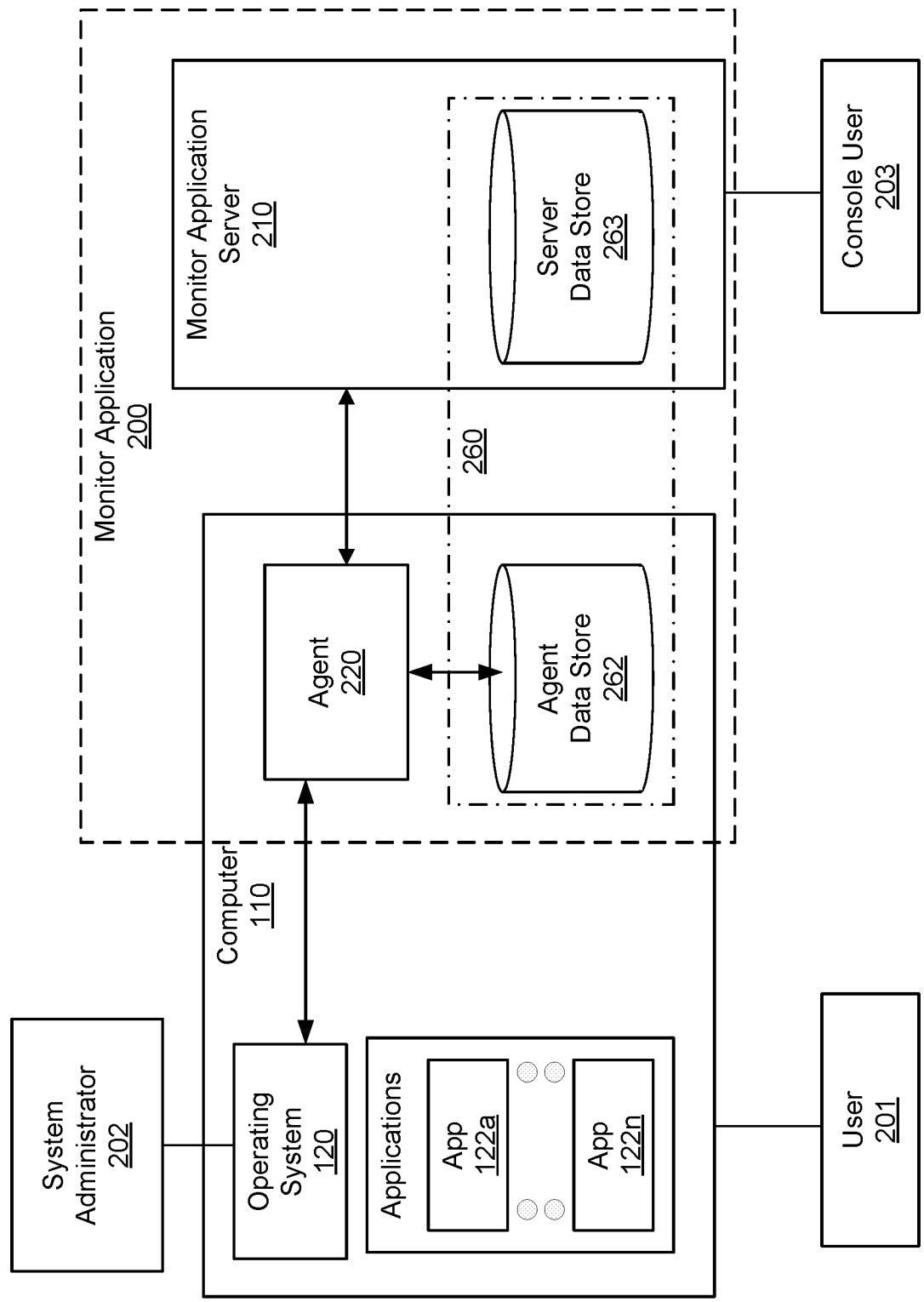
FIG. 2 is a schematic representation showing a particular implementation of the computer system in FIG. 1.

While FIG. 1 represents the monitor application 200 as a single entity for purposes of clarity while describing the embodiments, in practice the monitor application may be implemented in a distributed fashion. FIG. 2 is a schematic diagram of an exemplary distributed implementation of the monitor application 200. More specifically, the monitor application 200 in the FIG. 2 is distributed across the computer 110 and an external server (i.e., the monitor application server 210). More specifically, the monitor application 200 in the illustrated implementation includes an agent 220 with an agent data store 262 that is resident in the computer 110, and a monitor application server 210 with a server data store 263 remote from the computer 110. In some implementations, the monitor application server 210 communicates with the agent 220 via a wired or wireless communication network such as a local area network, a wide area network, or via the internet, for example, as a cloud based server.

In a typical implementation, the agent 220 is configured to communicate and interact with the operating system 120 of the computer 110. For example, the agent 220 may register for notifications from the operating system 120 when a specific user related activity is detected by the operating system 120. Upon receipt of a notification from the operating system 120 by the agent 220, the agent 220 may communicate notification data received from the operating system 120 to the monitor application server 210. For example, the agent 220 may forward all received notification data to the monitor application server 210, or the agent may selectively forward selected notification data to the motor application server 210, for example the agent 220 may be configured by the monitor application server 210 with a selection criteria to determine what notification data to forward to the monitor application server 210. Moreover, the agent 220 may process notification data it receives from the operating system 120 and then forward one or more notifications to the monitor application server depending on the outcome of its processing. The application data store 260 (of FIG. 1) may be distributed between the agent data store 262, which is resident on the computer 110, and a server data store 263, which is resident on the external monitor application server 210.

The agent 220 may be tailored to communicate with a specific operating system 120 resident on the computer 110. For example, the agent 220 may be specific to Windows OS, MacOS, or Unix/Linux, among others.

While FIG. 2 shows a single monitor application server 210, the monitor application server 210 may be distributed across two or more physical server devices. Likewise, the server data store 263 may be distributed across two or more physical server devices.

In general, in some implementations, the agent 220 may be configured to act as an intermediary between the operating system 120 and the monitor application server 210. IN some implementations, the agent 220 could convey collected data to the monitor application server 210, and the monitor application server may operate upon the collected data to determine if targeted activities have been performed by the user 201. Alternatively, the agent 220 may operate upon the collected data and then convey information to monitor application server 210 depending on the outcome of the agent's operations.

As referred to herein, the user 201 is a human who interacts with the computer 110, the system administrator 202 is a human who controls and configures the operating system 120 of the computer 110, and the console user 203 is a human who controls and interacts with the monitor application 200. Of course, there may be a plurality of users 201, system administrators 202, and/or console users 203. The different users 201, for example, may share computers or have their own respective computers 110. In some circumstances a system administrator 202 and the console user 203 may be the same individual.

Figure 3:
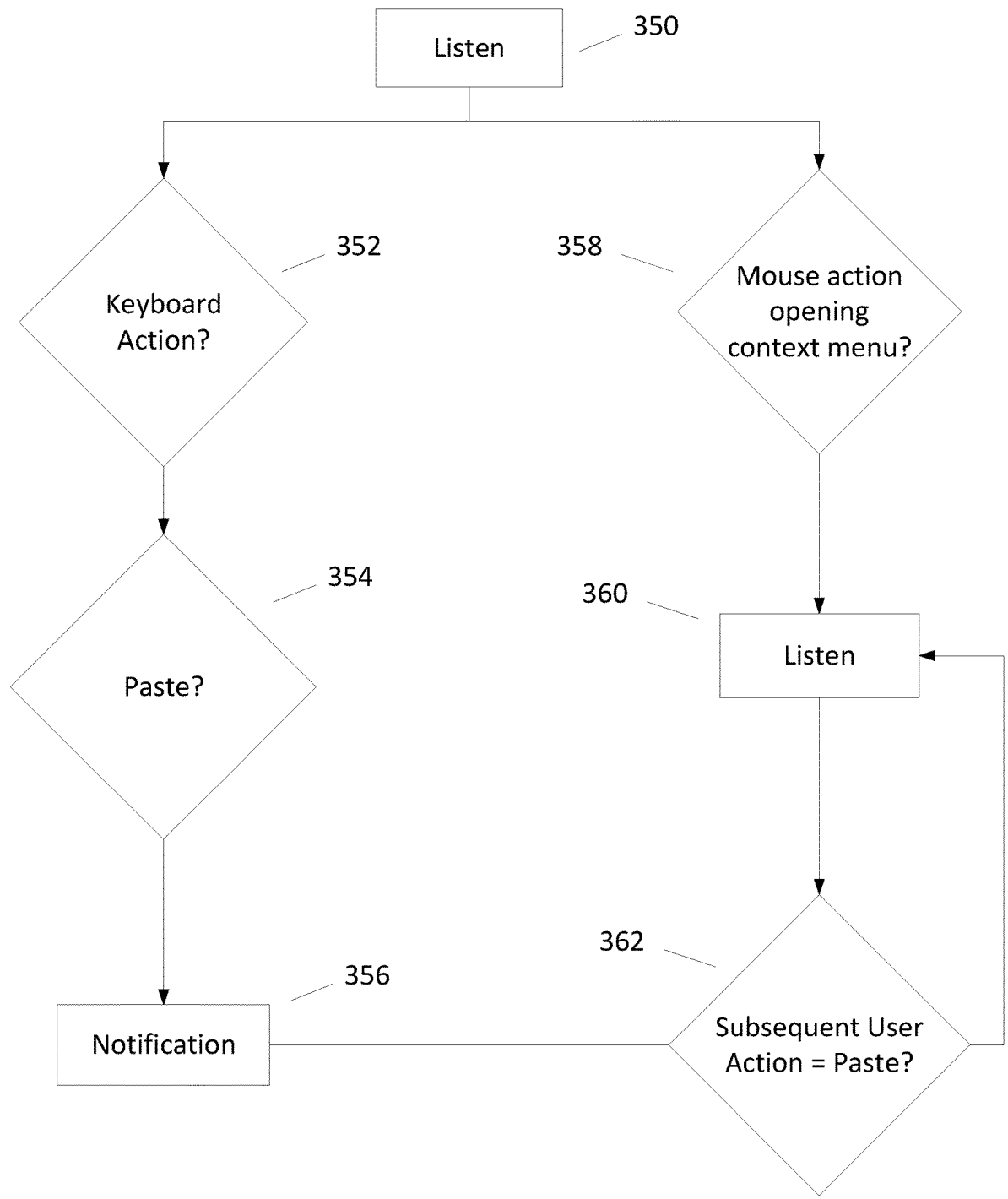
FIG. 3 is a flowchart of an exemplary process for detecting a user action that caused a paste activity to occur at a computer, and notifying a system administrator thereof.

FIG. 3 is a flowchart of an exemplary process that can be performed by the monitor application 200 (of FIG. 1 or 2) for detecting that the user 201 has caused a paste activity to occur at computer 110, and notifying the system administrator 202 accordingly. In some implementations, the notification to the system administrator 202 may be conditioned on whether the detected paste activity satisfies certain conditions, some of which may have been specified by the system administrator 202 (and that may be stored in the application data store, for example).

According to the illustrated process, the monitor application 200 (at 350) listens (e.g., waits and collects data from the computer 110) for indications from the computer 110 that the user 201 at the computer 110 has performed some action (e.g., pressing a combination of keys) to cause a paste, or performed some action (e.g., right-clicking the mouse) to open a context menu that might include a paste option.

If, while listening (at 350), the monitor application 200 (at 352) receives an indication from the computer 110 that the user 201 has performed a keyboard action (e.g., pressed a combination of keys, such as [Ctrl]+[v]), then the monitor application 200 (at 354) takes steps to determine if the keyboard action caused a paste action at the computer 110. There are a variety of ways that the monitor application 200 may perform this step. According to one such implementation, the monitor application 200 compares the key press combination represented in the indication it received from the computer 110 against a list of predefined key combinations that, if pressed, would cause a paste action to occur at the computer 110. In this regard, the monitor application 200 may maintain, in its application data store 260, a list of key combinations that, if pressed, can cause a paste action to happen at computer 110. This list may be prepopulated with popular key combinations that correspond to paste actions. In some instances, however, the list may be customized by the system administrator 202, for example.

If the monitor application 200 finds the key combination represented in the indication from the operating system (e.g., [Ctrl]+[v]) in the list of key combinations that, if pressed, cause a paste action at computer 110, then, the monitor application 200 concludes that a paste action has occurred. Then, the monitor application 200 (at 356) creates a notification that a paste has occurred with various information about the paste. In some instances, the notification is stored (e.g., in the application data store 260). In some instances, a notification or alert may be sent to the system administrator 202 with information about the paste. In various implementations, the notification may include, or include links to access to other information about the paste (e.g., who performed the paste, in which application, UI information like window title and uniform resource locator (URL), on which computer, from which client, when the paste occurred, with screenshots and/or videos of the paste event). There are a variety of ways in which the monitor application 200 may collect and assemble this additional information for inclusion in the notification to the system administrator 202, some of these are disclosed herein.

If, while listening (at 350), the monitor application 200 receives an indication (at 358) from the computer 110 that the user 201 has performed a mouse action (e.g., a right mouse click) that might have opened an on-screen context menu that has a paste option on computer 110, then the monitor application 200 (at 360) listens for a subsequent user action at the computer 110 (at 360) and, in response to the subsequent user action at computer 110, determines (at 362) if the subsequent user action caused a paste to occur. If the monitor application (at 362) determines that the subsequent user action at computer 110 has caused a paste to occur, then the monitor application 200 (at 356) creates a notification with information about the paste event that has occurred. In some instances, a notification or alert can be sent to the system administrator 202.

FIG. 4 shows a screenshot with an example of how a notification that a user 201 performed a paste operation might be presented to a system administrator 202.

The illustrated screenshot includes a timeline of actions by the user 201 at computer 110. Each entry in the timeline is time-stamped in the first column, identifies an associated process in the second column, provides a short summary of the associated user action in the third column, and provides a button that the user can select to access additional information about the event. The timeline includes an entry at 10:58:28 AM that identifies a paste activity by the user. On the left side of the screen is an indication that the application is Mail. "Very important" is the window title which in the Mail application is actually the subject of the mail being written so the system knows the user has pasted a file called templ.txt from his download folder (so the user probably has downloaded the file before) into a mail to send using the Mail application. The system also knows the mail subject. In a typical implementation, this is before looking into other activities that exist in the session).

In addition to identifying the paste activity itself, the timeline includes a listing of user actions that occurred before and after the paste activity. This helps provide the system administrator a bit more context about the paste activity. For example, the timeline indicates that the user accessed his email account at 10:52:07 AM and started a new email message at 10:52:09. The user included the subject line "very important" and that the paste occurred into that email.

Figure 5:
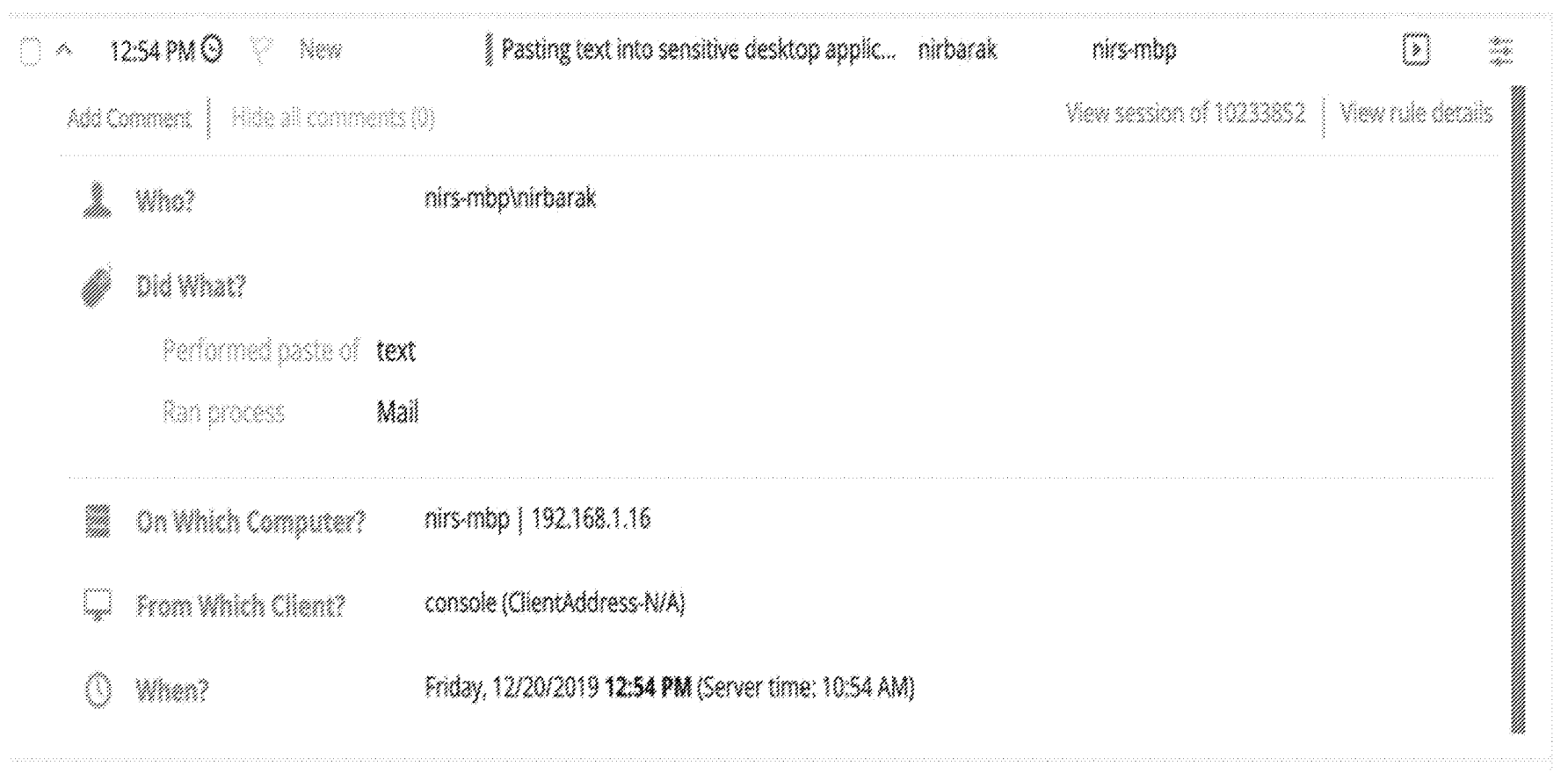

FIG. 5 shows a screenshot with an example of what the system administrator 202 might see if the system sends an alert about a paste activity.

The screenshot indicates at the top of the screen that information provided relates to a pasting of text into a sensitive desktop application (this is the alert name), user Nir Barak, and a computer with the name nirs-mbp. Below that, the screen has several sections that collectively answer the following questions: Who did what, on which computer, from which client, and when? The answers provided in the exemplary screenshot indicate that user Nir Barak (identified by the computer/user combination of nirs-mbp\nirbarak), performed a paste of text into a mail process, on computer nirs-mbp 1192.168.16, from client console (ClientAddress- N/A), which means that the client was a local, on Friday, 12/20/2019 at 12:54 PM (server time 10:54 AM).

There are a variety of ways in which the processes represented in FIG. 3 may be implemented, some of which may depend on the type of operating system (e.g., a Microsoft® Windows operating system, a MAC® operating system, a Unix or Linux operating system, etc.) running on the computer 110.

Figure 6:
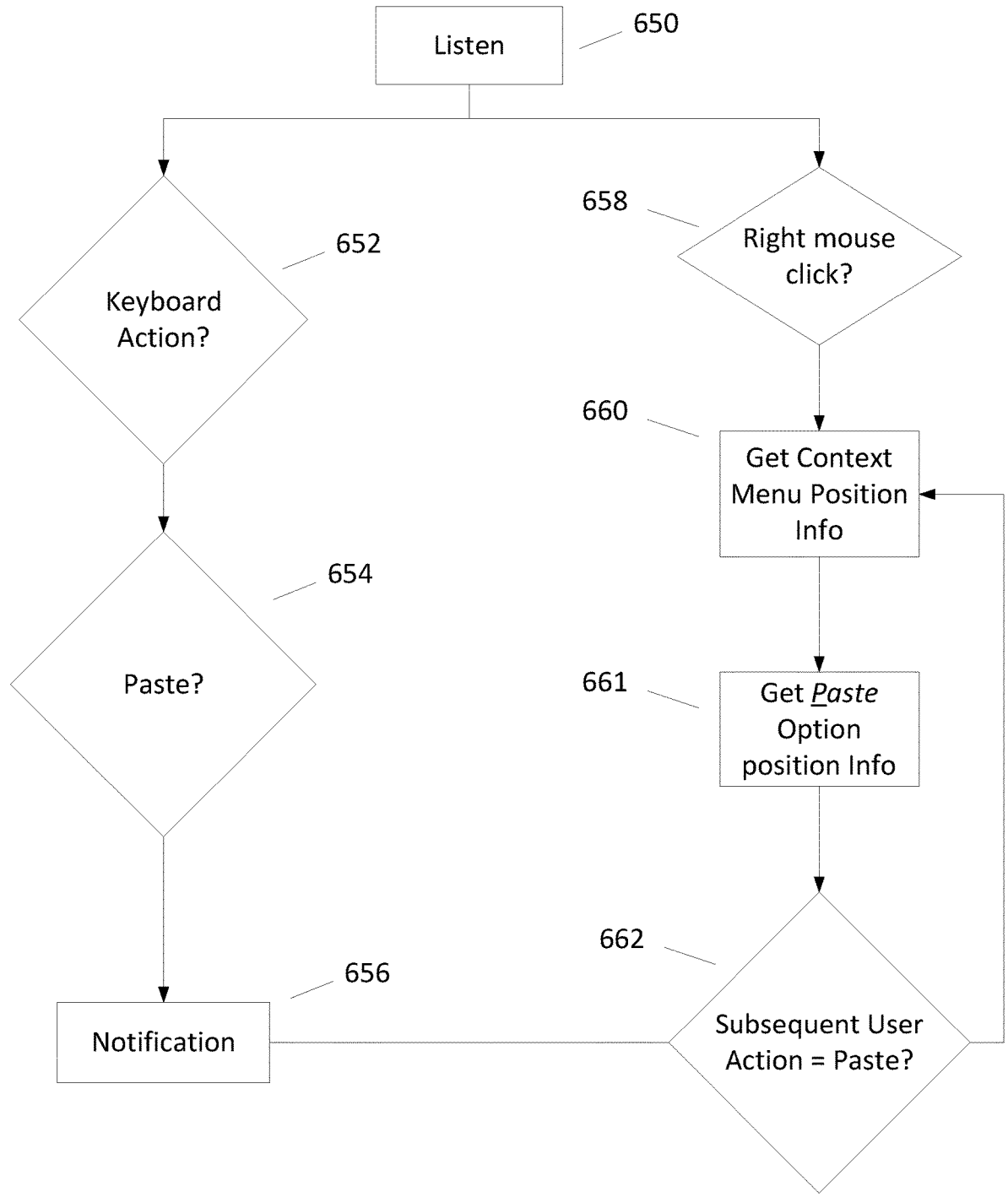
FIG. 6 is a flowchart of an exemplary operating system-specific process for detecting that a user has caused a paste activity to occur at a computer and notifying a system administrator thereof.

FIG. 6 is a flowchart of an exemplary process, specific to a Microsoft® Windows-based system, that can be performed by the monitor application 200 (of FIG. 1 or 2) for detecting that the user 201 has caused a paste activity to occur at computer 110, and notifying the system administrator 202 accordingly. This process is further specific to the application configuration in FIG. 2, where the monitor application includes an agent deployed on the computer 110, but otherwise resides at remote monitor application server 210.

According to the illustrated flowchart, the agent 220 of the monitor application 200 (at 650) listens for indications from the operating system 120 of the computer 110 that the user 201 at the computer 110 has performed some action (e.g., pressing a combination of keys) to cause a paste, or performed some action (e.g., right-clicking the mouse) to open a context menu that might include a paste option.

If, while listening (at 650), the agent 220 (at 652) receives an indication from the operating system 120 that the user 201 has performed a keyboard action (e.g., pressed a combination of keys, such as [Ctrl]+[v]), then the agent 200 (at 654) determines if the keyboard action caused a paste action at the computer 110.

If the agent 220 concludes that a paste action has occurred, then, the agent 220 (at 356) sends a notification to the system administrator 202 that a paste has occurred.

If, while listening (at 350), the agent 220 receives an indication (at 358) from the operating system 120 that the user 201 has performed a mouse action (e.g., a right mouse click or a left mouse click). In a Microsoft® Windows setting, a right mouse click typically opens an on-screen context menu that may include a paste option. There are a variety of ways that the agent 220 might receive this kind of indication. In one such implementation (a Windows environment), the agent 220 does so using the Windows USER (e.g., user32) methods. Windows USER is a Windows API for the Microsoft® Windows operating system that provides core functionality that can be used for building simple user interfaces. The component includes functionality for window management, message passing, input processing and standard controls.

Upon detecting a right mouse click (e.g., by receiving an indication of the right mouse click from the computer's operating system), the agent 220 (at 660) collects information about the context menu. In some implementations, this includes the agent 220 calling the accessibility API 125 to request the opened context menu location and boundary. The accessibility API 125 returns the requested information, which typically indicating where on the computer screen the context menu is located and all of its bounds—left, top, right, and bottom.

Figure 7:
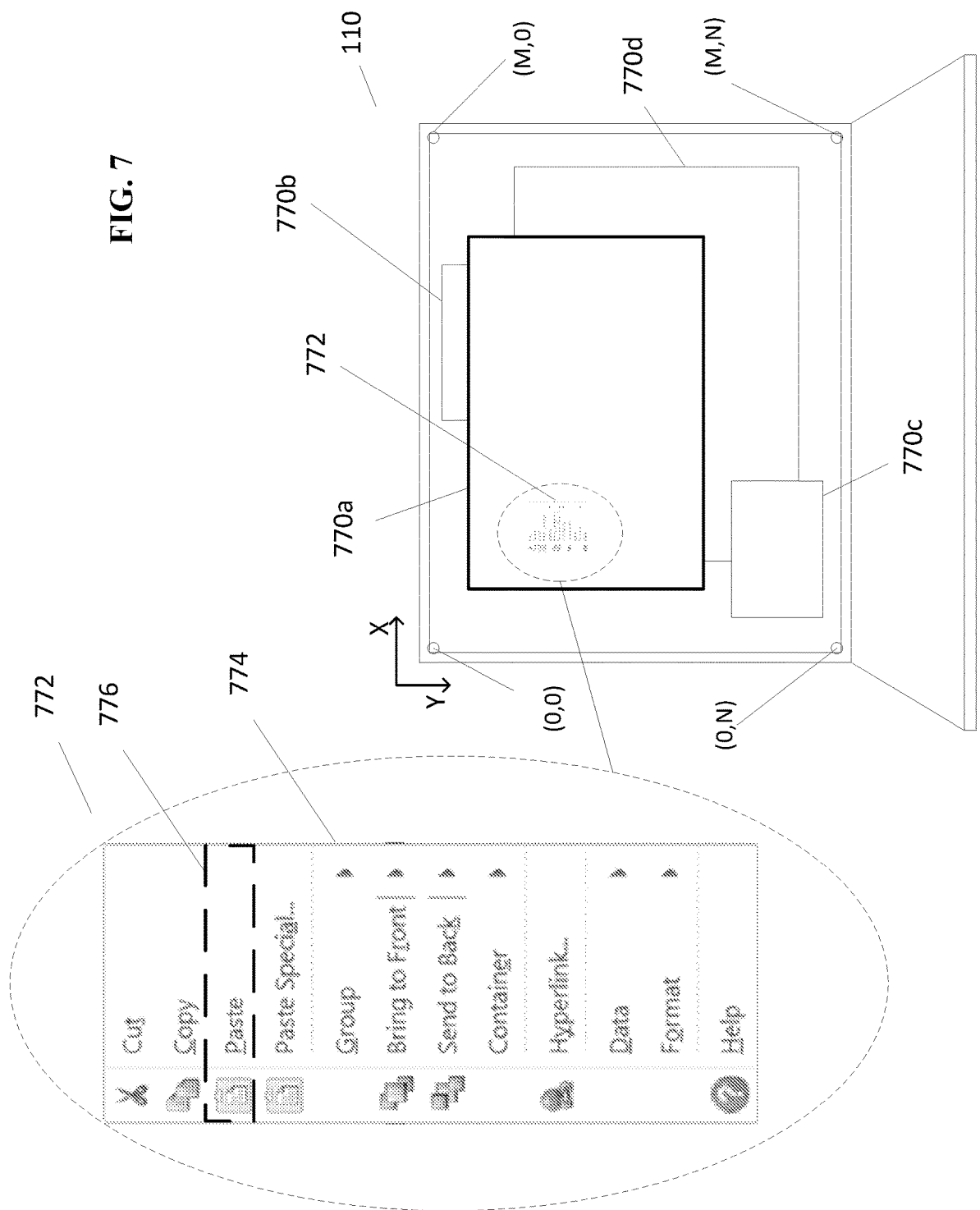
FIG. 7 is a schematic representation of a user computer that has a plurality of windows open on its screen and a context menu on one of those screens.

FIG. 7 shows an example of a user computer (e.g., computer 110) that has a plurality of windows 770a-770d open on its screen. In various implementations, each window may be displaying a different document and/or application. Four such windows are visible in the illustrated example. Window 770a, in the illustrated example, which has a thicker border than the other windows includes the context menu 772, which is the active (or "in focus") window (i.e., the window that the user 201 is currently accessing or has most recently accessed). Positions on the screen can be defined by a Cartesian coordinate system with a horizontal axis (labeled "x"), and a vertical axis (labeled "y"). The x-axis and the y-axis in the illustrated example originate in the upper left corner of the screen and respectively extend in a right direction and a downward direction. According to this system, the upper left corner of the screen has screen coordinates of x=o, y=o, the lower left corner of the screen has screen coordinates of x=0, y=n (where n equals the number of points on the y-axis from the top of the screen to the bottom of the screen), the upper right corner of the screen has screen coordinates of x=m, y=0 (where m equals the number of points on the x-axis from the left of the screen to the right of the screen), and the lower right corner of the screen has screen coordinates of x=m, y=n.

The context menu 772 has a rectangular border 774, with a left side, a right side, a top side and a bottom side. The illustrated context menu 772 offers the user twelve options: cut, copy, paste, paste special, group, bring to front, send to back, container, hyperlink, data format, help. Each entry on the context menu that corresponds to one of these twelve options has a border. To illustrate, a dashed line has been added to the zoomed-in version of the context menu 772 showing the border 776 of the Paste option in the illustrated context menu 772. Any one of the twelve options presented in the illustrated context menu 772 can be selected by positioning the mouse cursor within the border 776 of context menu portion that corresponds to that option and then left-clicking the mouse. Alternatively, any one of the twelve options presented in the illustrated context menu can be selected by pressing the key that corresponds to the letter that is underlined in the word that appears in that portion of the context menu. So, for example, if the context menu is on-screen and the user presses the key for the letter "P," that will cause a paste since the letter "P" is underlined in the word Paste as it appears in the context menu.

In response to the agent's request for information on the context menu's location and boundary information, the accessibility API 125 typically returns to the agent screen coordinates for the left side, right side, top side, and bottom side of the context menu border 774.

Additionally, in a typical implementation, the agent 220 (at 660) calls the accessibility API 125 to detect the menu item on the context menu containing the text "Paste." In response, the accessibility API 125 returns the screen coordinates for the left side, right side, top side and bottom side of the Paste option border 776. As an example, the accessibility API 125 might return a sequence of numbers, such as 15, 10, 25, 30, where 15 represents the x coordinate of the left side of the Paste option border 776, 10 represents the y coordinate of the top side of the Paste option border 776, 25 represents the x coordinate of the right side of the Paste option border 776, and 30 represents the y coordinate of the bottom side of the Paste option border 776.

Next, the agent 220 listens for a subsequent user action at the computer 110 and, in response to the subsequent user action at computer 110, determines (at 662) if the subsequent user action caused a paste to occur. If the subsequent user action is a left mouse click by the user 201, then the agent 220 will receive an indication as such (through Windows USER (user32)). The indication typically includes information (e.g., screen coordinates) that identifies where on the screen the click took place. The agent 220 then checks if the screen position that corresponds to the mouse click coordinates is inside the border of the Paste option on the context menu 772. Again, the border information (e.g., screen coordinates) for the Paste option can come from the accessibility API 125.

So, in regards to the example above, if the agent 220 receives an indication that the left click occurred at a position corresponding to screen coordinates x=17, y=20, then the agent 220 will check if these coordinates fall within the border of the Paste option on the context menu 772 as defined by the screen coordinates received from the accessibility API 125. In this case, screen coordinate x=17 falls between x=15 (left side of Paste option) and x=25 (right side of Paste option), and screen coordinate y=20 is between y=10 (top side of the Paste option) and y=30 (bottom side of the Paste option). The agent 220, in this example, would conclude (at 662) that the subsequent user action (i.e., a left mouse click on the Paste option of the context menu 772) was, in fact, a paste action.

If, on the other hand, the agent received an indication that the left click occurred at a position corresponding to screen coordinates x=19, y=33, then the agent 220 would check if these coordinates fall within the border of the Paste option on the context menu 772 as defined by the screen coordinates received from the accessibility API 125. In this case, screen coordinate x=19 falls between x=15 (left side of Paste option) and x=25 (right side of Paste option), but screen coordinate y=33 is NOT between y=10 (top side of the Paste option) and y=30 (bottom side of the Paste option). The agent 220, in this example, would conclude (at 662) that the subsequent user action (i.e., a left mouse click outside the border of the Paste option of the context menu 772) was not a paste action.

If the agent 220 concludes (at 662) that the Paste option on the context menu 772 was selected (e.g., by a left mouse-click), then, in a typical implementation, the agent 220 refers to the last clipboard copied item that it obtained from a process that detects copy actions using user32 methods and pulls the data from the clipboard to the agent 220 so when the paste menu item is clicked the last copied value can be evaluated and put inside the paste event that is sent to the monitor application server, for example. In some implementations, the process mentioned here is an agent process, in another implementation, the process is a different process inside the agent. In some instances, there can be one process running under system privileges (the main agent process which for keyboard and mouse hooking may need extra privileges) and the other agent process (called dlmonitor) running under user privileges to get data visible on the user level, like the user clipboard.

Figure 8:
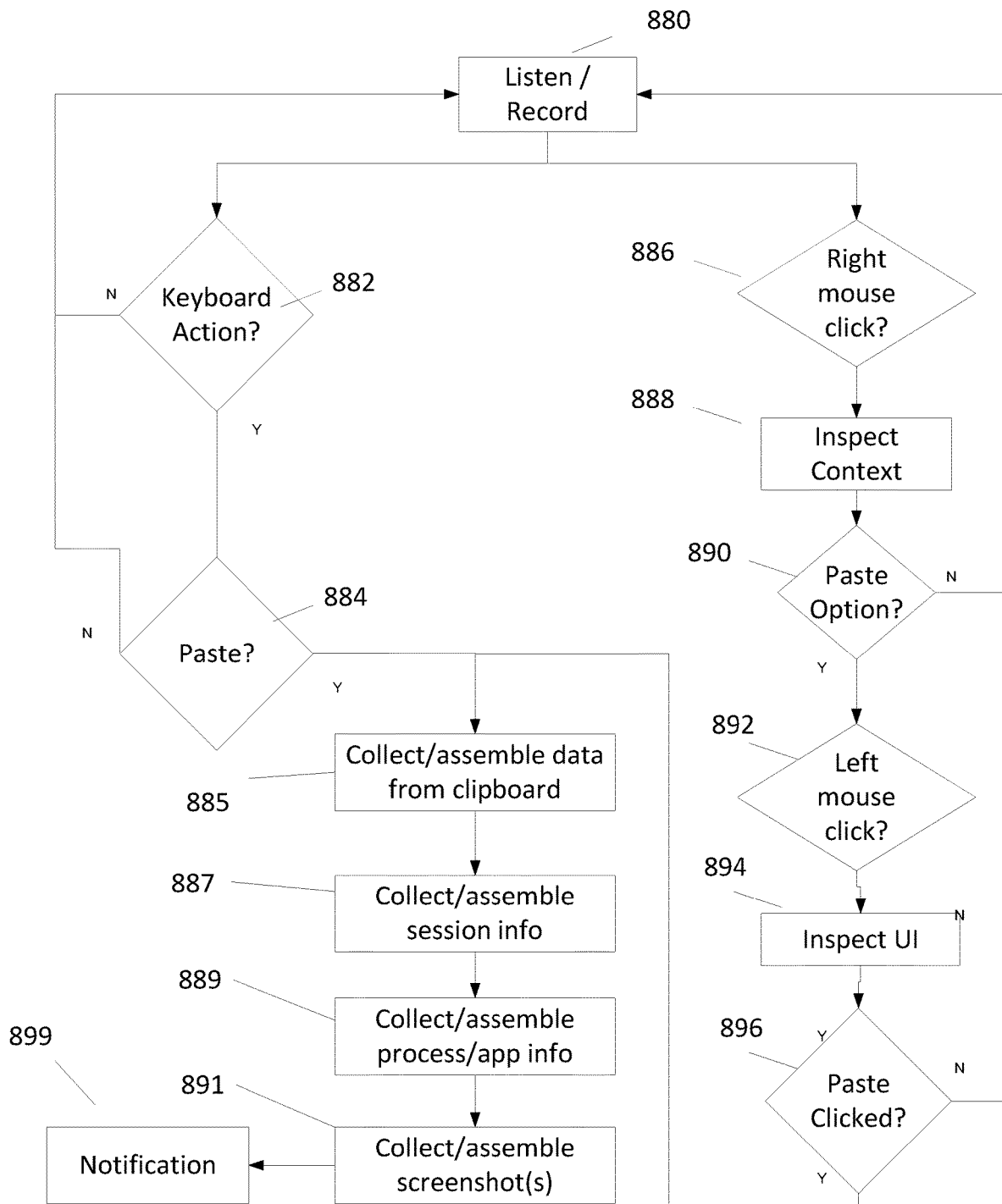
FIG. 8 is a flowchart of another exemplary operating system-specific process for detecting that a user has caused a paste activity to occur at a computer and notifying a system administrator thereof.

FIG. 8 is a flowchart of an exemplary process, specific to a MAC® operating system, that can be performed by the monitor application 200 (of FIG. 1 or 2) for detecting that the user 201 has caused a paste activity to occur at computer 110, and notifying the system administrator 202 accordingly. This process is further specific to the application configuration in FIG. 2, where the monitor application includes an agent deployed on the computer 110, but otherwise resides at remote monitor application server 210.

According to the illustrated flowchart, the agent 220 of the monitor application 200 (at 880) listens for indications from the operating system 120 of the computer 110 that the user 201 at the computer 110 may have performed some action to cause a paste (e.g., pressing a combination of keys), or performed some action to open a context menu that might include a paste option (e.g., right-clicking the mouse).

If, while listening (at 880), the agent 220 (at 882) receives an indication from the operating system 120 that the user 201 has performed a keyboard action (e.g., pressed a combination of keys, such as [Command]+[v]), then the agent 220 (at 884) determines if the keyboard action caused a paste action at the computer 110. If the agent 220 concludes that a paste action has occurred (which, as discussed elsewhere herein can also be done based on mouse click(s)), then, the agent 220 performs a sequence of steps (885, 887, 889, and 891, discussed below) and sends a notification (at 899) to the monitor application server 210.

The monitor application server 210 can notify the system administrator 202 of the paste event in response to the receiving the notification from the agent 220. In this regard, the monitor application server 210 may apply one or more rules, stored in server data store 263, to determine if each paste event truly warrants sending notification to the system administrator 202. Some of these rules may have been entered into the server data store 263 by or on behalf of the console user 203 and some of these rules may have been entered into the server data store 263 by or on behalf of the system administrator.

In some implementations, the monitor application server 210 may be configured to notify the user at computer 110 that a particular paste event that the user caused might be problematic in some way. More particularly, in this regard, the monitor application server 210 may compare the information it receives from the agent about a particular paste event against a set of rules (stored in server data store 263) that the system administrator, for example, may have entered. This sort of notification may be delivered any one (or more) of a variety of formats, including via a pop-up message, a text, or an email.

If the agent 220 (at 886) receives an indication from the operating system 120 that the user 201 has performed an action (such as right-clicking a mouse) that might open a context menu at the computer 110 and that context menu might include a paste option, then the agent 220 (at 888) takes steps to inspect the contents of the context menu to determine if a Paste option is present. There are a variety of ways that the agent 220 might perform this function. According to one implementation, the agent first obtains information about open windows at the computer 110 from the user interface 123 for the computer 110.

The user interface 123 for the computer 110 can provide a variety of information about open windows (e.g., 770a-770d, and the context menu 772, which is its own window) at the computer 110. In a typical implementation, the information that the user interface 123 provides to the agent 220 can include, for example, an indication of which windows (e.g., 770a-770d) are open at the computer 110 and respective handles for those windows. In this context, a handle is a unique identifier for a specific one of the open windows. In the example of FIG. 7, each window 770a-770d and the context menu 772 would have a unique handle.

The user interface 123 can also identify to the agent 220 which of the open windows (i.e., 770a, 770b, 770c, or 770d or context menu 772) is "in focus" (i.e., which of the open windows is the user 201 currently accessing or has most recently accessed). In an exemplary implementation, the user interface 123 gives the agent the handle for the "in focus" open window. Since the "in focus" window is the window that the user 201 is accessing or has most recently accessed, the context menu 772 at issue, which the user 201 would have just called up, would be the "in focus" window, and not in any of the other windows.

After the agent 220 gets the handle for the "in focus" window (e.g., the context menu 772), the agent 220 can, and does, pass that window handle over to the accessibility API 125 (e.g., at 894) with a request for the accessibility API 125 to provide information about information within that window. This information can include, for example, information about the context menu 772. In a typical implementation, the accessibility API 125 is able to provide a variety of information about control elements, including context menus, inside a particular window.

In a typical implementation, the accessibility API 125 responds to the agent's request by providing information about the "in focus" context menu 772. This information includes, for example, the on-screen position of the context menu 772, the options available on that context menu, the on-screen position of these options (including the Paste option, if available), and/or any combination of these or other pieces of information about the context menu. In identifying the on-screen position of the Paste option in the context menu, the accessibility API 125 may provide screen coordinates that define the left side, right side, top side, and bottom side of the border of the on-screen Paste option. As discussed below, in a typical implementation, the agent 220 can and, in a typical implementation, does use these screen coordinates for the on-screen Paste option to determine whether a subsequent left mouse-click at a particular set of on-screen mouse-click coordinates were within the borders of the Paste option on the context menu.

If the information returned from the accessibility API 125 indicates that the on-screen context menu has a Paste option, then the agent 220 (at 890) concludes, of course, that the context menu at computer 110 has a Paste option. In that case, the agent 220 may store the information it receives about the context menu in the agent data store 262 and then go back to listening.

Subsequently (e.g., at 892), if the agent 220 receives an indication from the operating system 120 that the user 201 has performed some action (such as left-clicking the mouse) that might, depending on the position of the mouse cursor at the time of the click, have caused a paste to happen at the computer 110, then the agent 220 (at 894) contacts the user interface 123 to ask whether the user's left mouse-click selected the Paste option on the context menu 772. The user interface 123 responds to the agent 220 by indicating whether the user's left mouse-click selected the Paste option on the context menu 772. If the user interface 123 responds that the user's left mouse-click did in fact select the Paste option on the context menu 772, then the agent 220 (at 896) concludes that a paste event has occurred.

According to the illustrated implementation, once the agent 220 has concluded (at 884 or 896) that a Paste has occurred, then the agent 220 collects and/or assembles information including the text data, image data, etc. that may have been pasted in the paste event (at 885), information about the session that included the paste event (at 887), information about the process or application into which the paste occurred (at 889), and screenshot(s) taken immediately after the paste (at 891). In a typical implementation, the agent 220 can get the text data, image data, etc. that may have been pasted from the clipboard. In a typical implementation, session data as well as process and application data, etc. can be obtained from the user interface 123.

Any additional information collected (e.g., in 885, 887, 889, and 891) is optional, but can be helpful to the system in creating notifications or alerts that provide robust contextual information about the paste event being flagged. This additional information can be used by the system to filter paste events so that the system administrator only gets notified of or alerted to those paste events having the greatest degree of relevance to that system administrator. More specifically, in a typical implementation, any such additional information collected (e.g., in 885, 887, 889, and 891) is correlated to the paste event and sent to the monitor application server 210. Additionally, in some implementations, the agent 220 also correlates a paste event with a previous copy event in the same session, so the agent can identify not only information about the paste activity, but also where the data being pasted was copied from. Considered within the context of a user session, the agent can also obtain and provide information about other activity in the session to provide even more contextual information about the paste event.

According to the illustrated implementation, the agent 220 (at 899) sends a notification about the detected paste event to the monitor application server 210. The notification can include a variety of information about the paste event, including, of course, any combination of the various paste event information (including, e.g., user identification, session identification, application or process identification, screenshot(s), etc.) mentioned herein.

In a typical implementation, the monitor application server 210 stores the notification and/or the information it receives about a particular paste event in the server data store 263. This information can be used by the monitor application server 210 to filter out which of the paste events warrant a notification or alert to the system administrator 202, create notifications or alerts to the system administrator 202 for paste events that warrant such notifications or alerts, and facilitate searching of paste events based on search parameters specified by and search requests initiated by the system administrator 202.

Figure 9A:
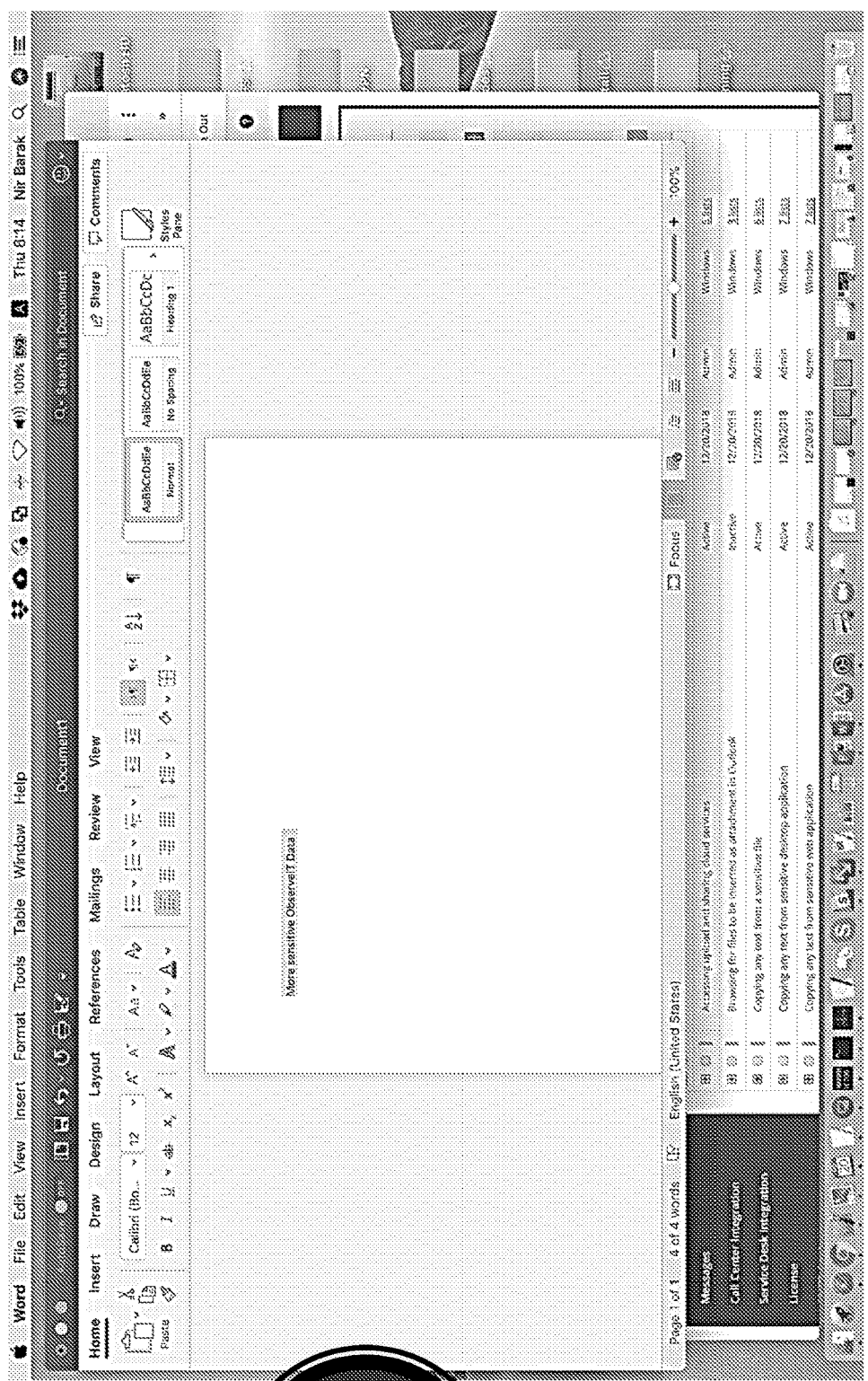
FIGS. 9A-9Q show a series of exemplary screenshots that represent or illustrate some of the functionalities associated with the systems and techniques disclosed herein.
Figure 9A:
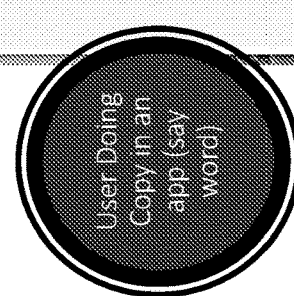
Figure 9B:
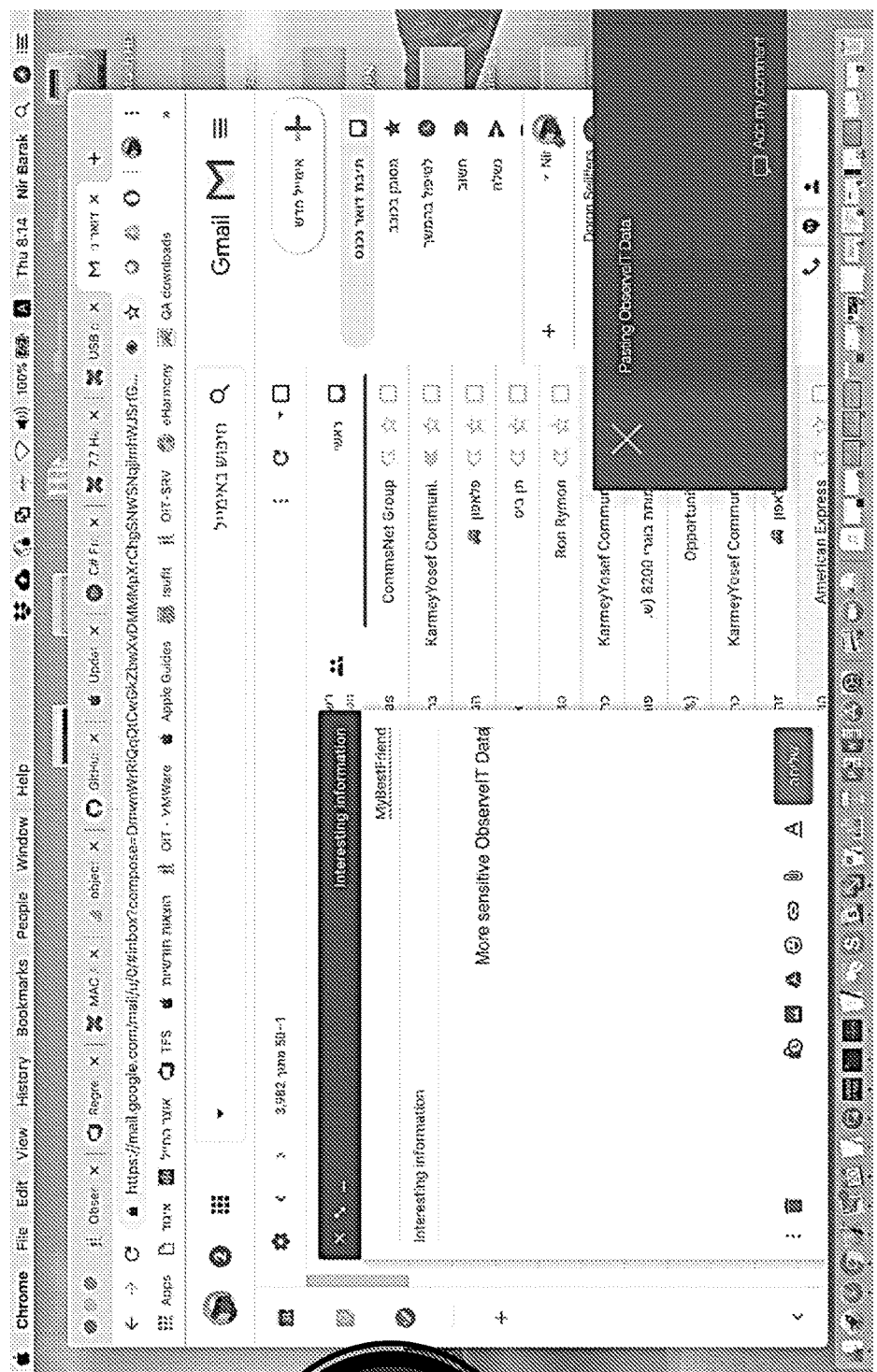
Figure 9C:
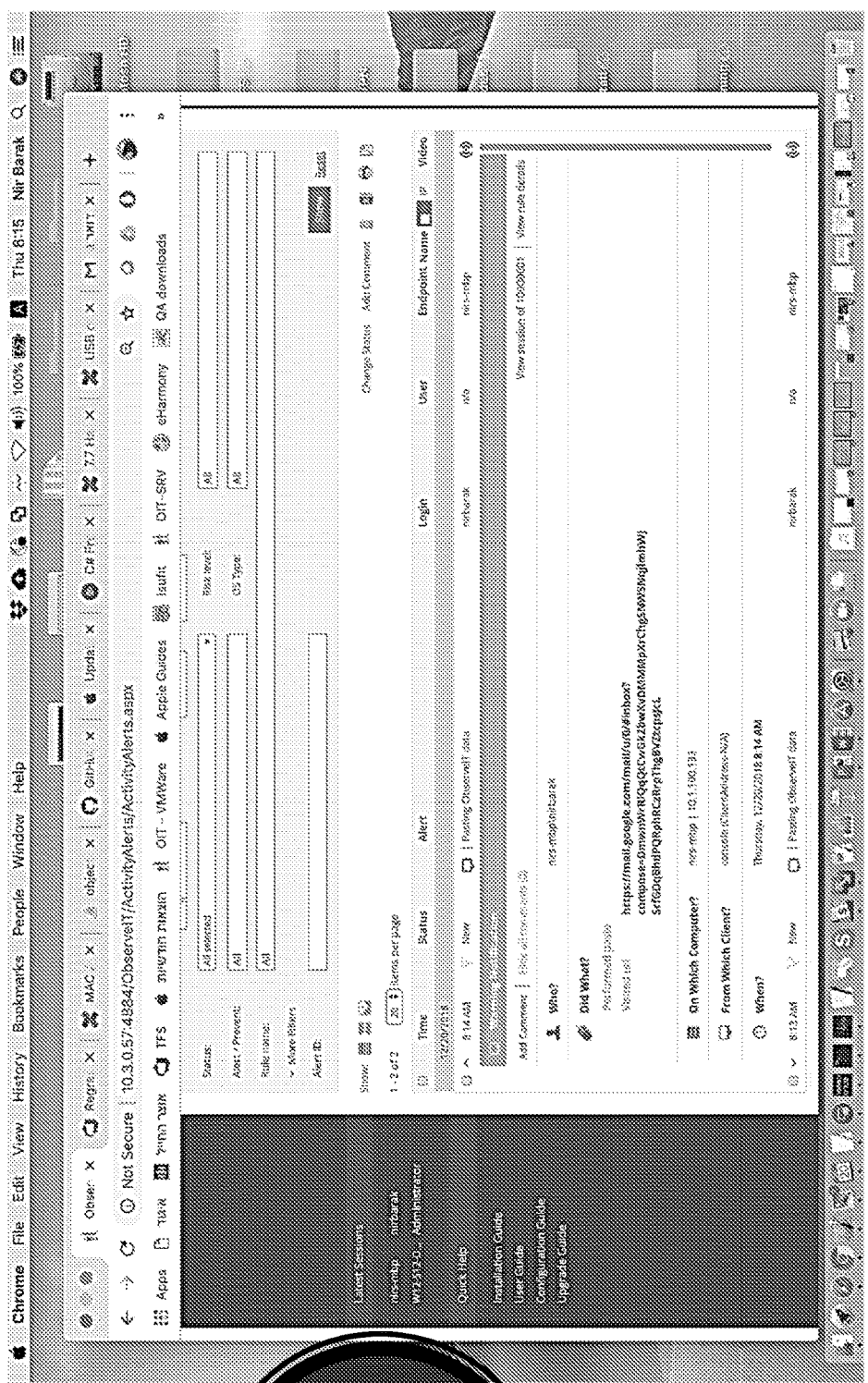
Figure 9D:
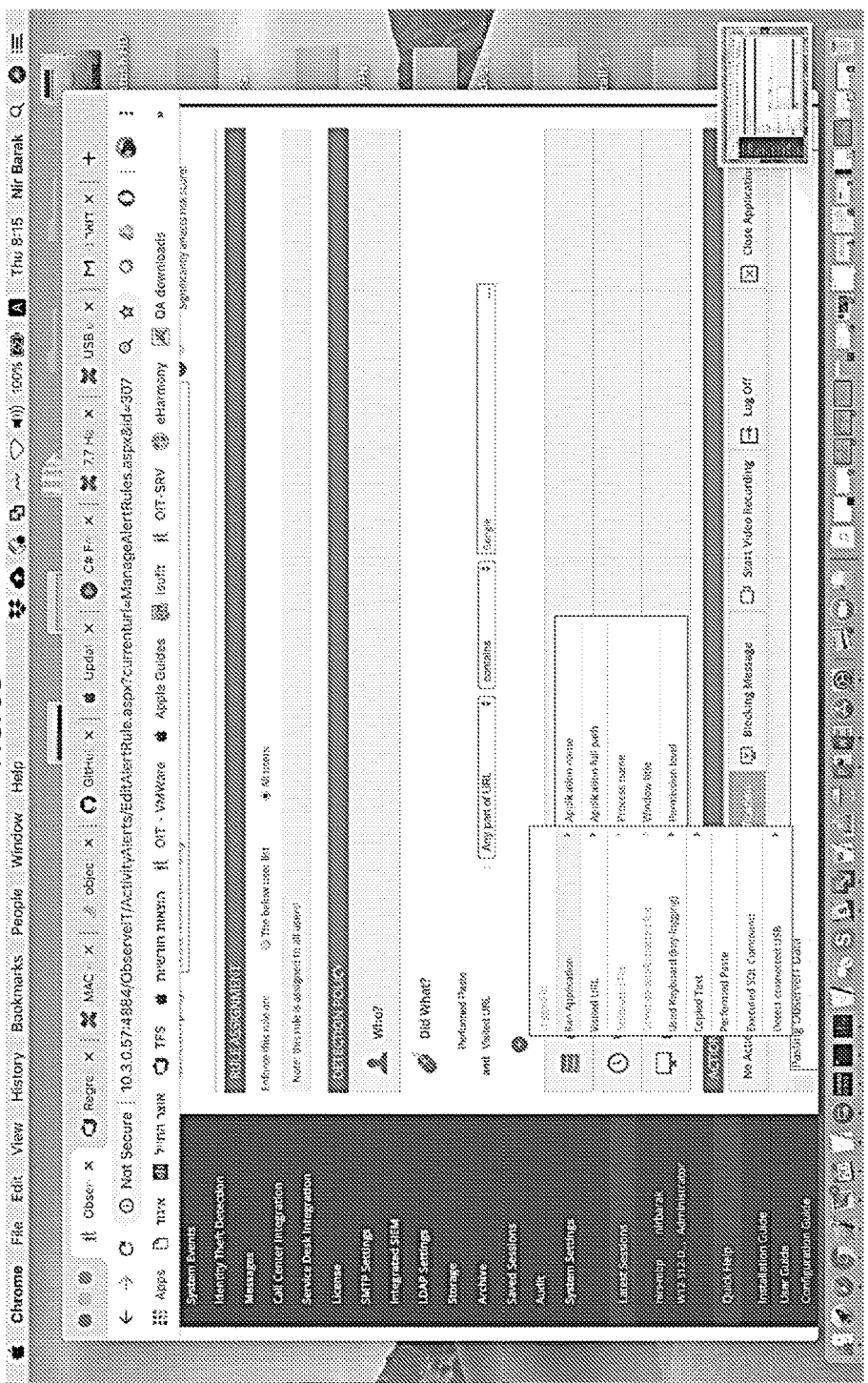
Figure 9E:
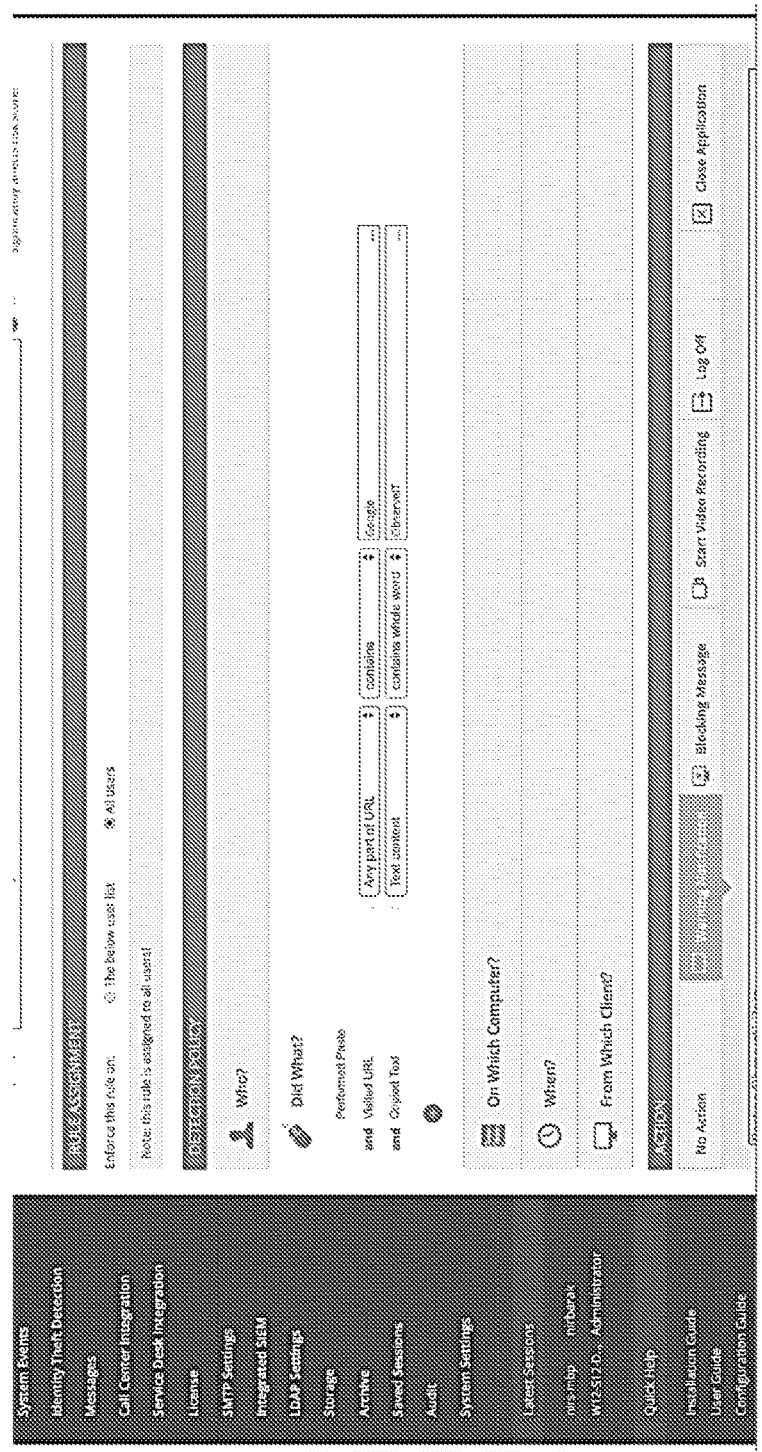
Figure 9E:
Figure 9G:
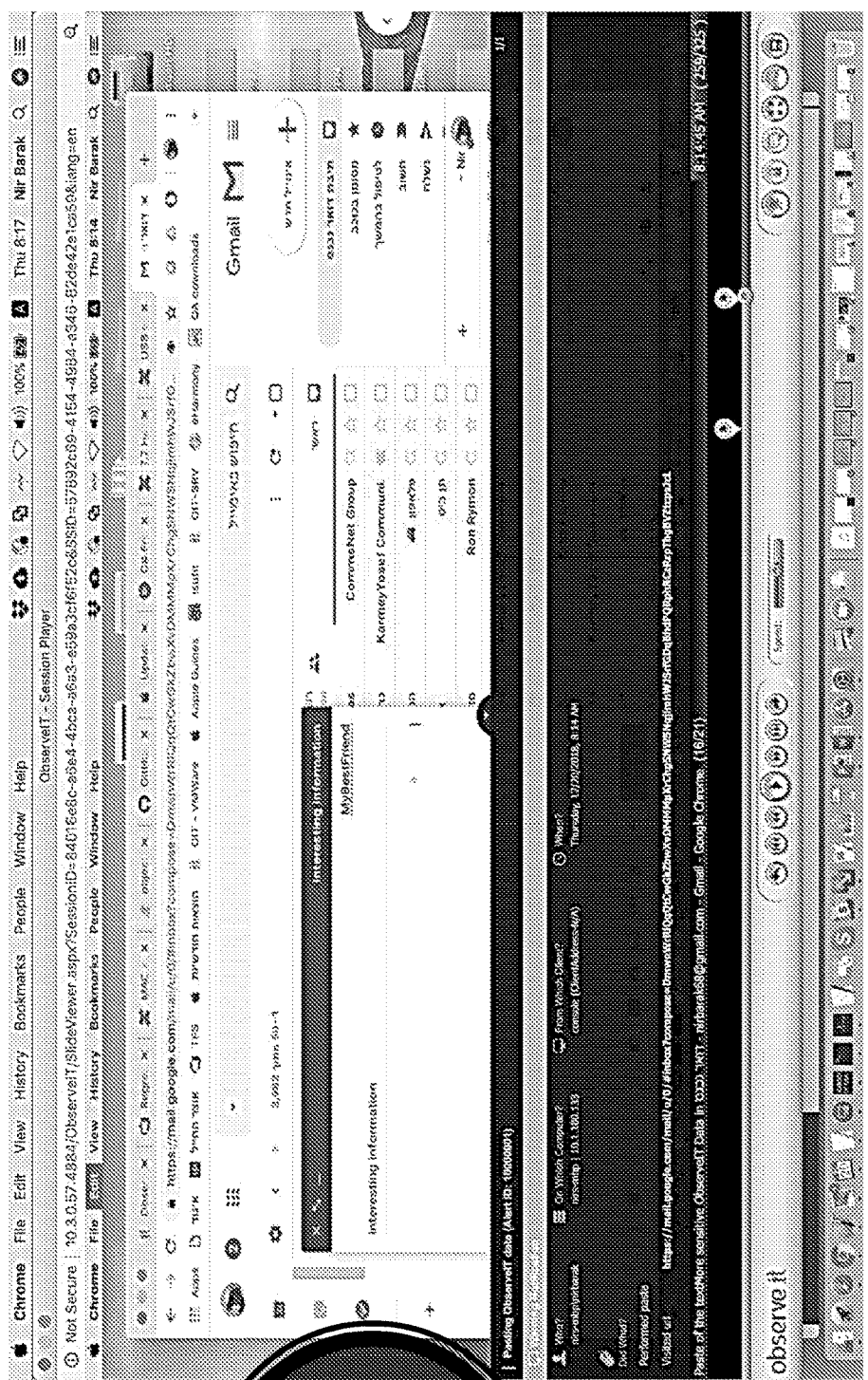
Figure 9H:
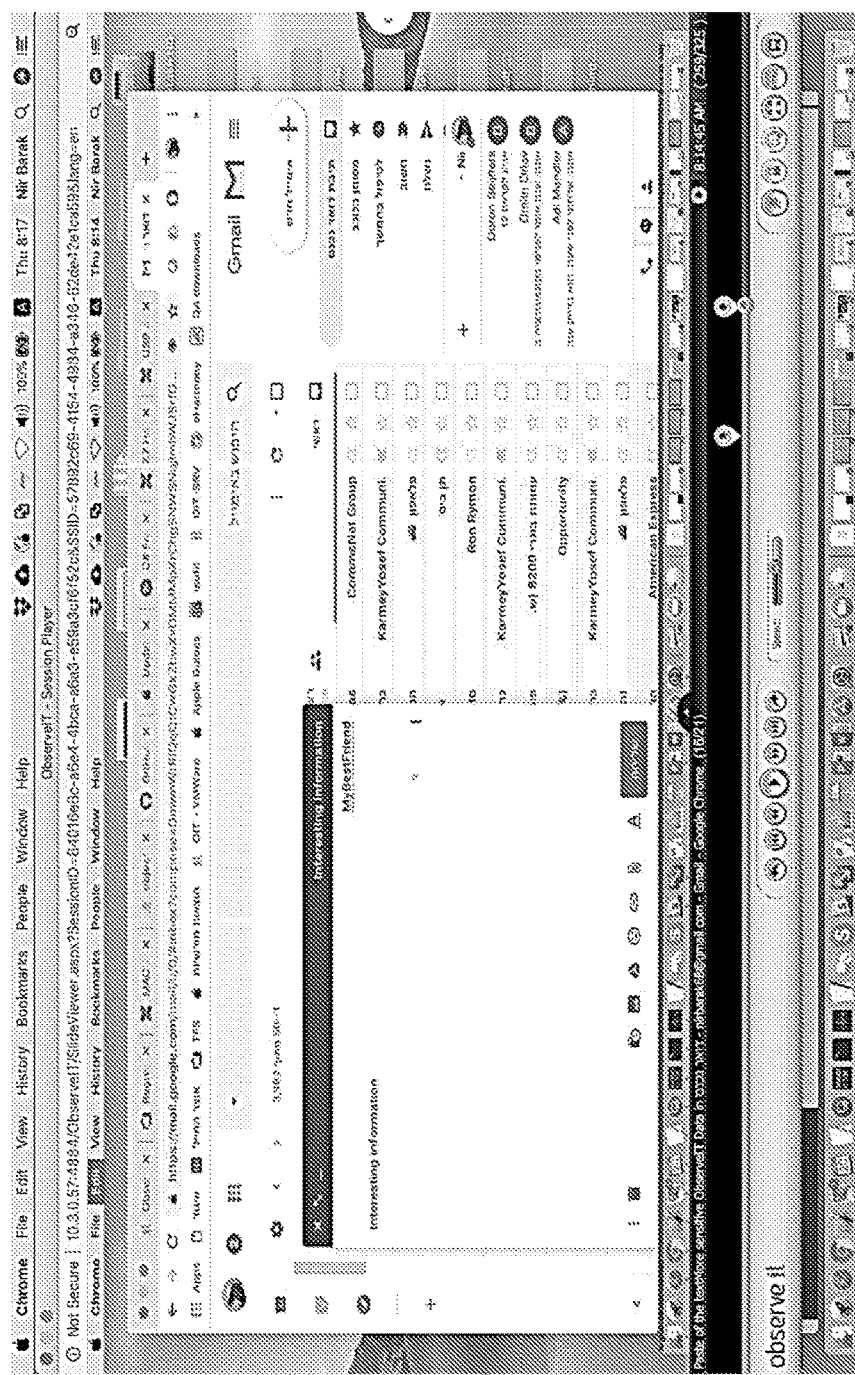
Figure 9I:
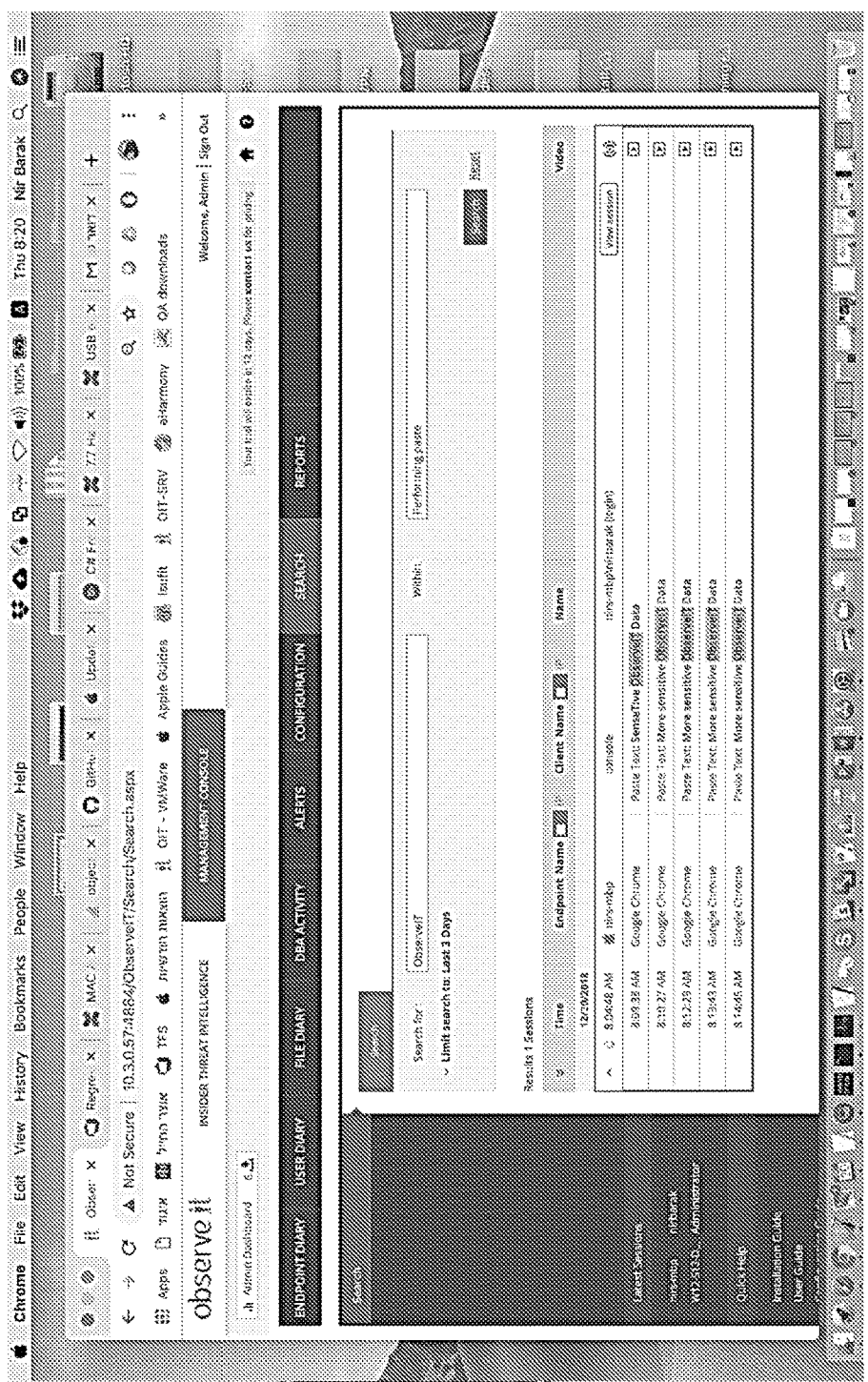
Figure 9J:
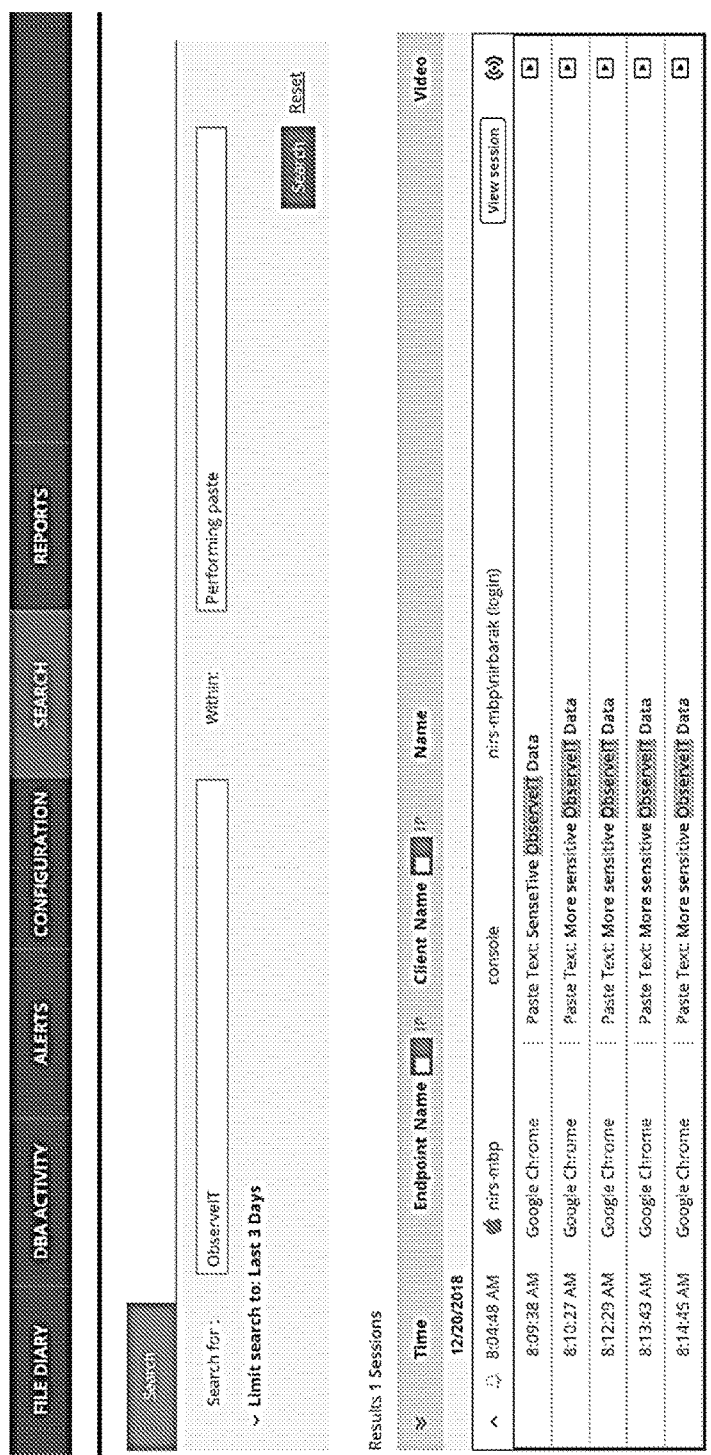
Figure 9K:
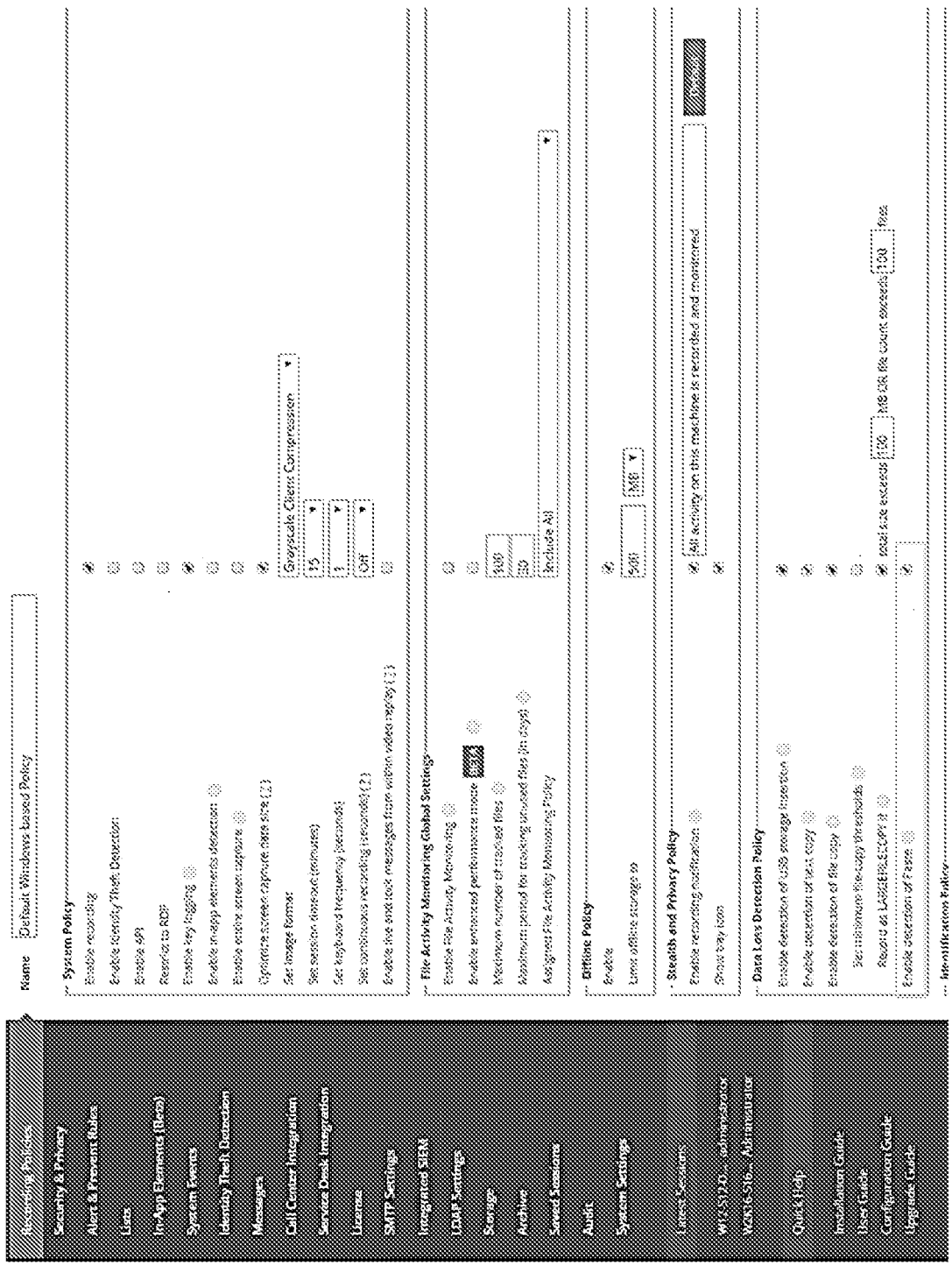
Figure 9L:
Figure 9M:
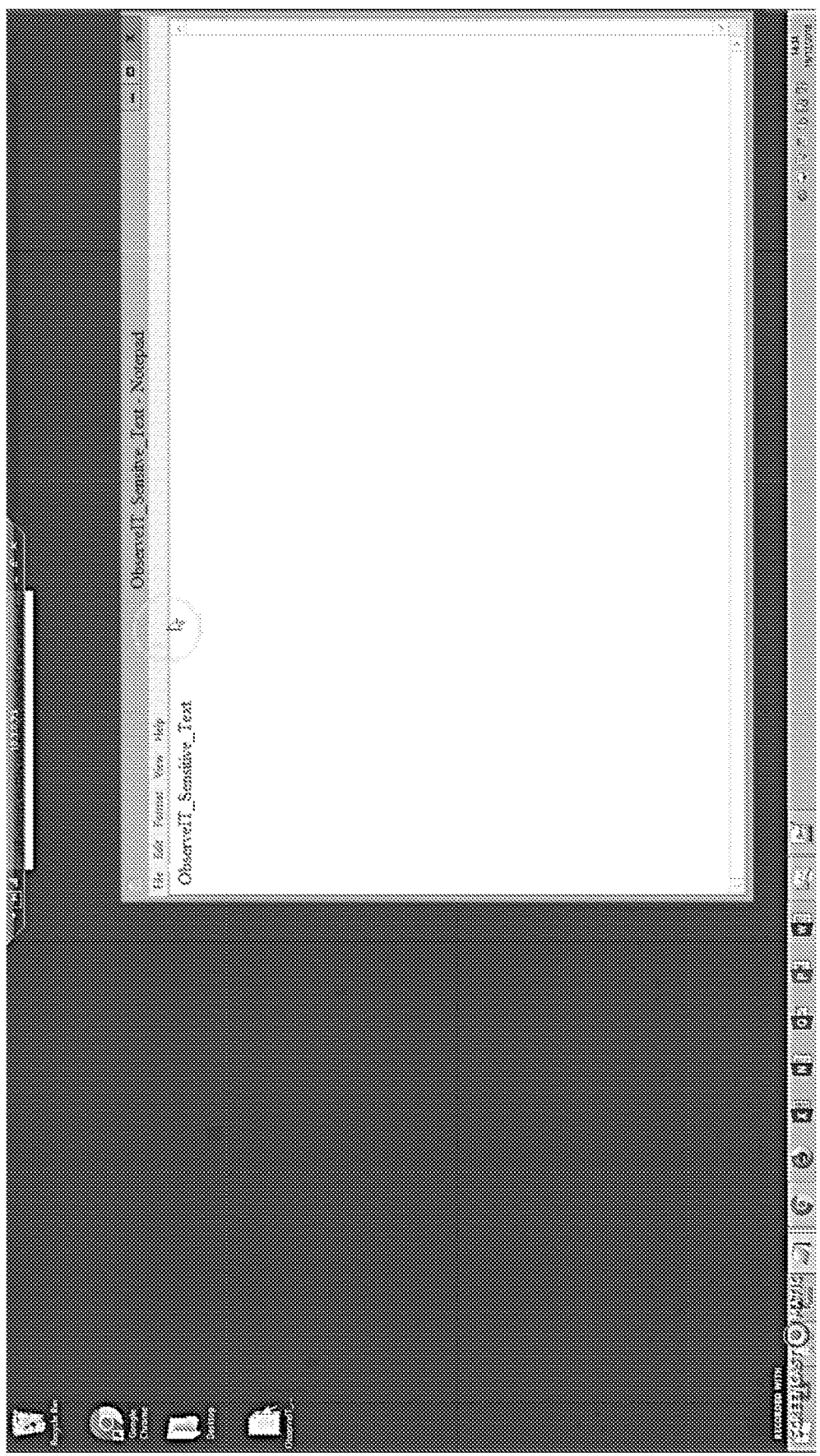
Figure 9N:
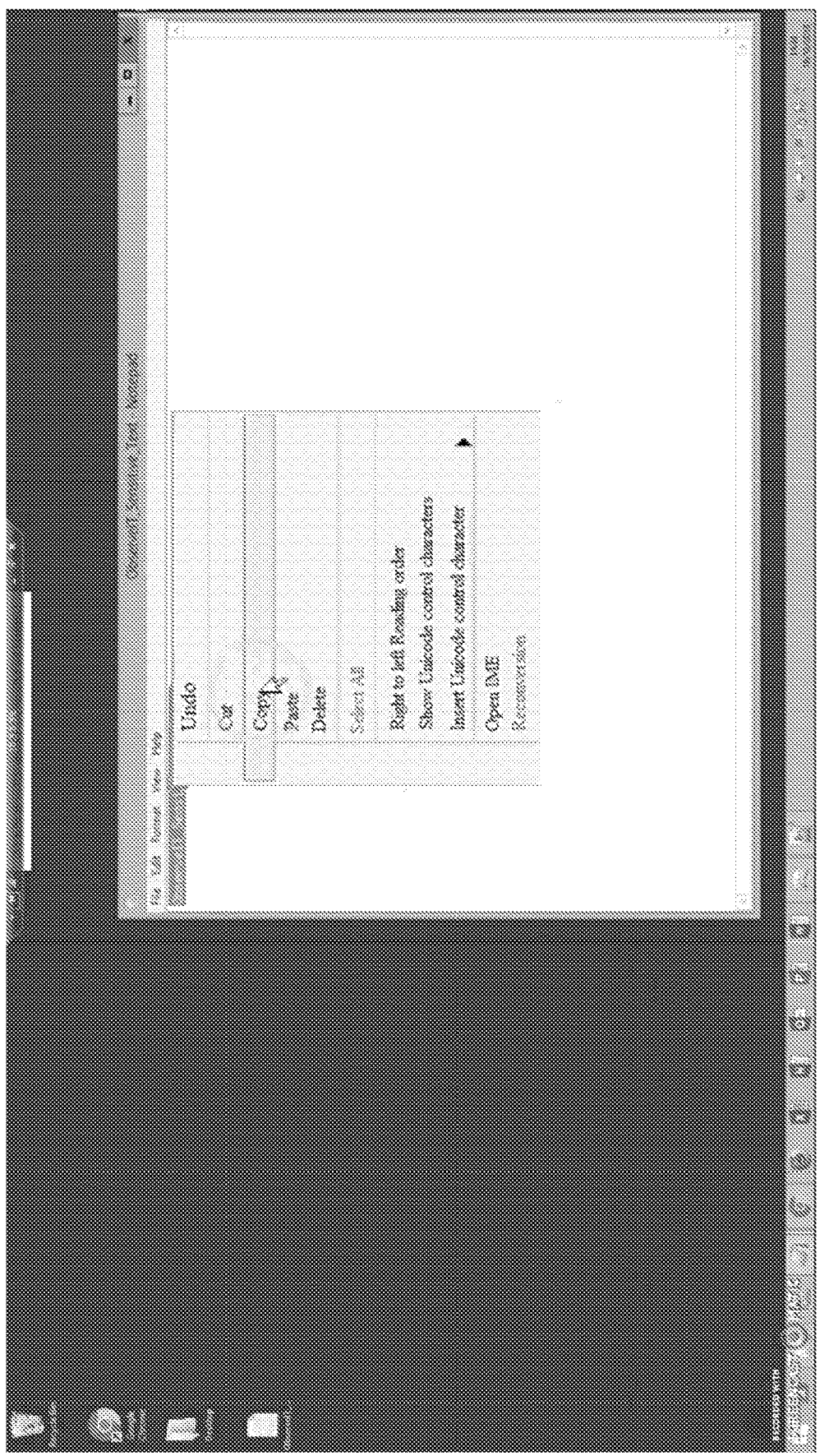
Figure 9O:
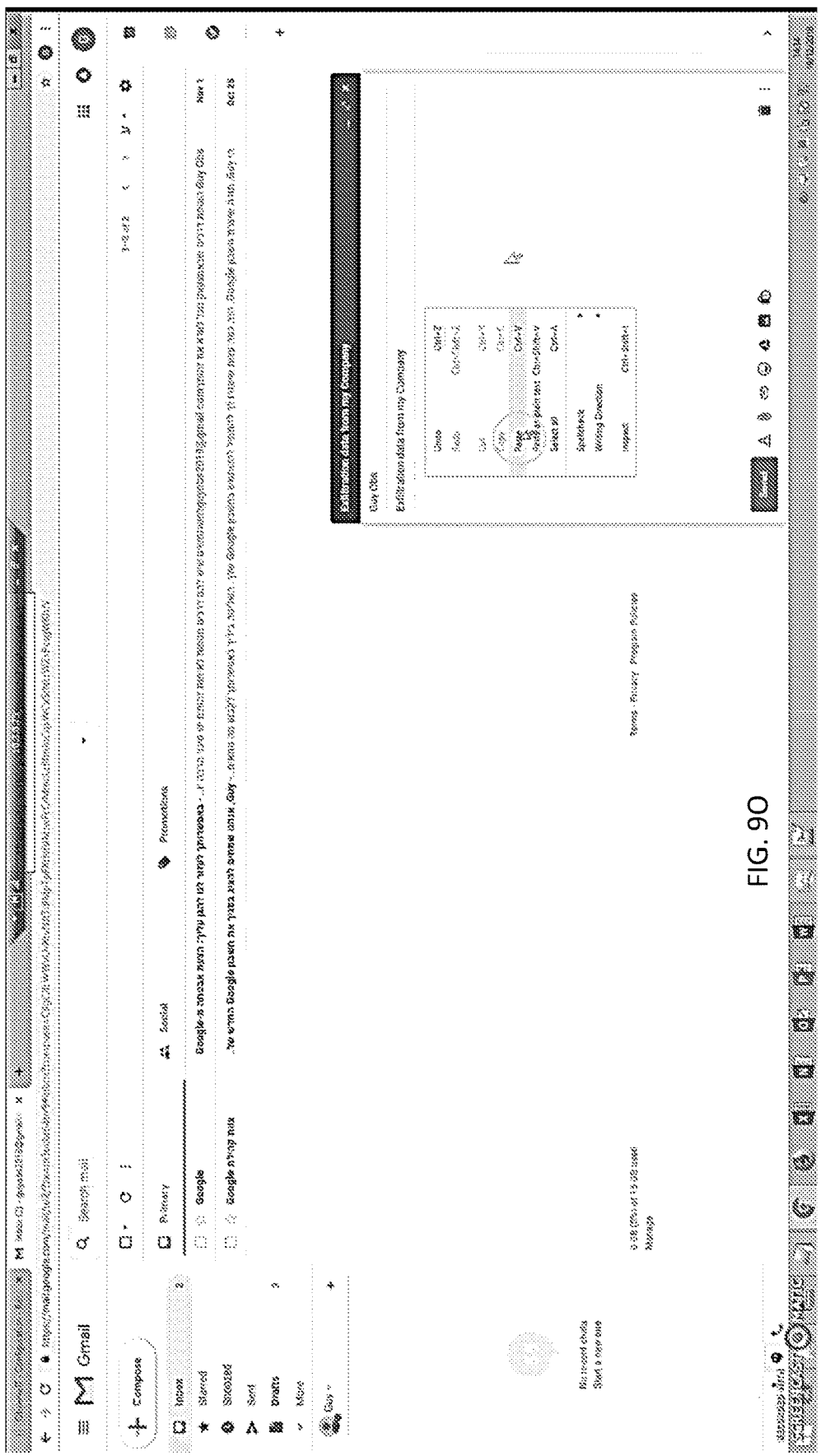
Figure 9P:
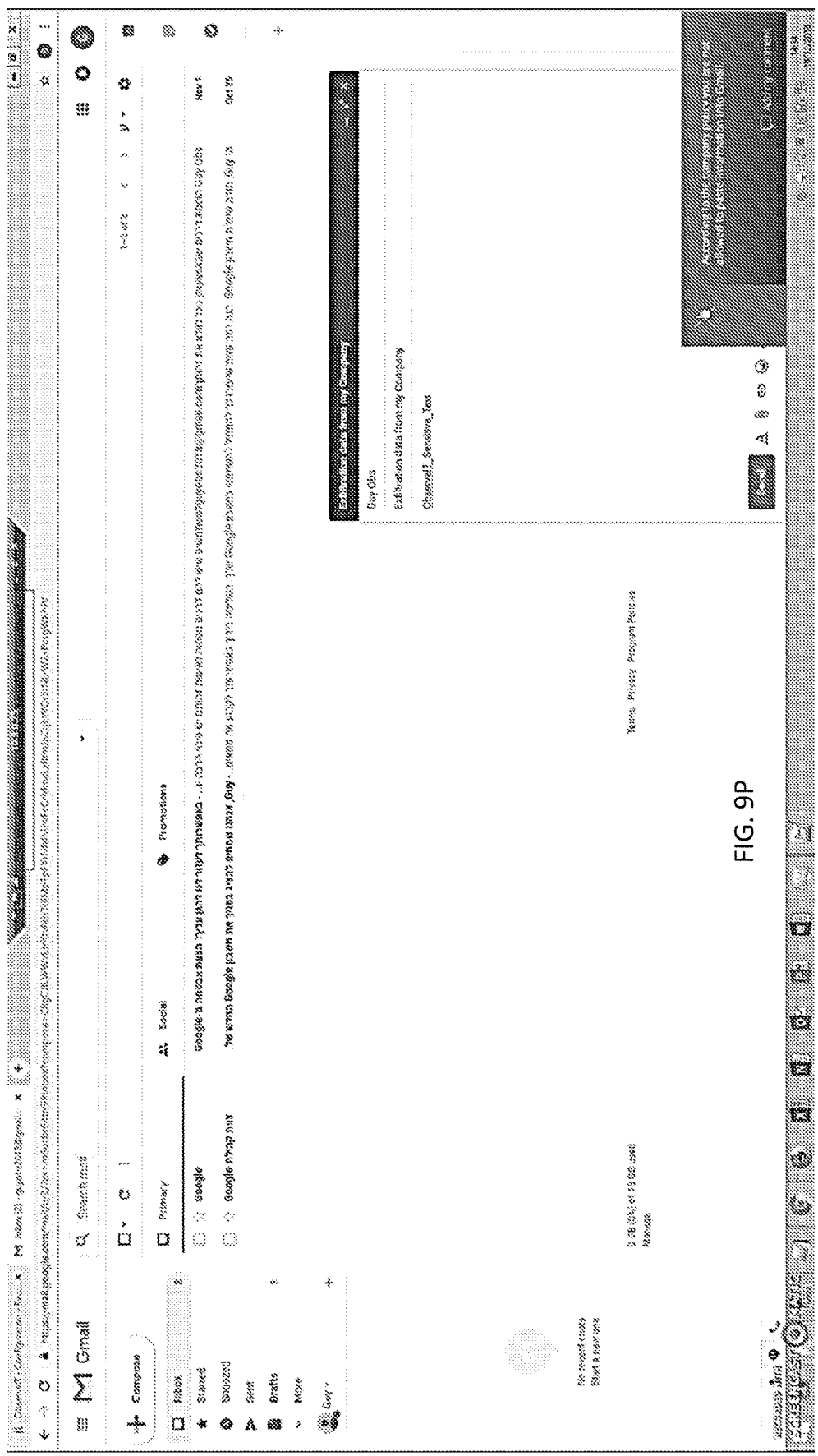
Figure 9Q:

FIGS. 9A-9Q show a series of exemplary screenshots that represent or illustrate some of the functionalities associated with the systems and techniques disclosed herein.

FIG. 9A shows a user is doing a copy of text, specifically, "More sensitive ObserveIT Data" from a particular application, in this case, a Microsoft® WORD® document.

FIG. 9B shows the user doing a paste of the copied "More sensitive ObserveIT" text into a different application, in this case, into an email being created within the user's personal, Gmail® account. In a typical implementation, when the user performs this paste operation, the operating system of the user's computer where the paste occurred provides interfaces for the paste detection system (the system) to get the information that enables the system to determine that a paste has occurred. In a typical implementation, paste detection gets the data from the operating system; the operating system typically provides interfaces to get the data but does not provide data on its own.

In a typical implementation, the system is configured to determine, based on the information provided by the operating system, where the pasted information was copied from, what applications were involved in the copy and/or the paste, what specific data (e.g., text, image, file, etc.) was copied and/or pasted, and what screenshots show the paste occurring (and, optionally, steps leading up to the paste), etc. In some implementations, the system is configured to determine where the pasted information was pasted to. In these instances, a monitor may detect this based on the window in focus at the time the paste activity was detected. In an exemplary implementation, when a paste takes place, the operating system, provides to the paste detection and assessing system information indicating that a particular key (or series of keys) has/ve been selected and/or that a particular drop down menu item has been accessed, and/or that a particular input (or sequence of inputs) has/ve been entered with a mouse (or the like), the application(s) involved with each action or set of actions, the user involved in the paste, the computer name where the paste happened, information identifying the session where the paste took place, and/or one or more screenshots showing the paste (and optionally a few clicks prior to the paste) taking place, etc.). Moreover, in some implementations, the operating system may be configured to provide basic information like keyboard or mouse clicks, but other information (e.g., whether a paste has occurred, etc.) is not provided by the operating system, instead, the paste detection figures out this other information looking into user actions like UI controls opened and selected data inside it.

FIG. 9C shows the paste activity (of FIG. 9B) having been caught by the system and an alert having been created by the system. The illustrated screenshot is an example of a system interface for an administrator of the system.

The screenshot has a set of filters that can be manipulated by the system administrator to show various different types of notifications. The illustrated configuration enables the administrator to filter based on status, risk level, alert/prevent, operating system type, rule name, and/or alert ID. In various implementations, other types of filters and/or different combinations of filters may be provided as well.

The screenshot also shows a warning notification for a particular user action. The warning notification identifies, who performed the action ("nirs.mbp\nirbarak"), what was done ("performed paste" at a visited URL for a personal Gmail® account), on which computer ("nirs-mbp 1 10.1.100.133"), from which client ("console (ClientAddress-N/A)," which refers to the local console or laptop), and when ("Thursday 12/20/2018 8:14 AM"). In a typical implementation, all of the information presented about the indicated user action would have come from, or been derived from information provided by, the operating system for the computer where the action occurred.

FIG. 9D enables an administrator to create an alert or, more particularly, to identify parameters that define user paste-related actions that would warrant alerting the administrator.

The screenshot includes a rules assignment section. The rules assignment section allows the administrator to identify whether a particular rule should be enforced on all users in a particular network, or just certain users.

The screenshot includes a detection policy section that allows the administrator to identify parameters of a detection policy. More particularly, in a typical implementation, the detection policy section allows the administrator to specify information about who would need to perform the indicated action, what action would need to be done, on which computer or computers, from which clients, etc. to trigger the system to send an alert to the administrator.

In specifying what the action would need to be done, the screenshot shows "performed paste" and "visited URL" and enables the administrator to specify that "any part of the URL" "contains" a particular sequence of characters, which in the illustrated example, is "Google." This means that the paste happened inside a browser, which uses URLs.

The screenshot shows a popup-style menu for choices that the administrator can select from to specify what types of actions might trigger the system to send an alert to the administrator. The choices include running an application, visiting a particular URL (uniform resource locator), using the keyboard (key-logging), copying text, performing a paste, executing a SQL (structured query language) command, detecting a connected USB, etc. A further popup-style menu is shown nested under the "run application" selection and enables specifying application name, application full path, process name, window title, and permission level.

FIG. 9E indicates that a rule for an alert can create a pop up warning for the user. The warning might warn the user, for example, that data exfiltration is a violation of company policy, etc. The warning message is hidden (i.e., below the screenshot in FIG. 9E). However, the screen shows that there is a warning message action that can be picked. Also, the user (e.g., administrator) may specify the warning message.

FIG. 9F shows an activity chronological view that lists user activities in chronological order as part of a session's activities, including a paste activity and its position among other actions.

FIG. 9G shows that from an alert, the administrator can access for viewing one or more screenshots taken from the user's computer when the action (e.g., the paste) was performed to see it visually. In some implementations, the system captures a series of screenshots for each action (e.g., paste), sometimes one screenshot per user click. The series of screenshots for a particular paste may include several screenshots before the paste (e.g., showing a copy that preceded the paste) and the paste itself. The interface shown in the illustrated screenshot has a set of video controllers that allow the administrator to play the series of screenshots, pause, rewind, fast forward, control the speed of playback, etc.

FIG. 9H shows a playback of a screenshot (e.g., from a series of screenshots) involved in a user's paste action. In a typical implementation, the product will show also the data pasted. This also exists, in a typical implementation, on the screenshot that includes the activity, you can also move the screenshot before or after to see what happened before and after the paste.

FIG. 9I shows that if there was no rule setup for a particular alert, in a typical implementation, the system still catches all pastes and the administrator, from the screenshot indicated, can still search for a particular paste. The specific interface shown allows the administrator to search for particular text (e.g., "ObserveIT," which was identified by the administrator in the text box) within a certain type of user action (e.g., "performing paste") recorded by the system. The interface allows the user to limit the search to a particular period of time as well (e.g., the "last 3 days").

In response to the administrator entering search criteria and selecting the search button, the system presents a list of matching data, as shown.

FIG. 9J shows that the administrator can search paste activity based on data inside the content and jump from it to the activity and screenshot.

In a typical implementation, the system facilitates or enables searching generally or by a specific part of the data.

Typically, there will be many ways to navigate between the screens in a particular system. You can jump between activity and playback (e.g., activity includes icons on the right to allow it).

FIG. 9K shows that an administrator can set recording policies for the system, one of which (at the very bottom of the page) is a data loss detection policy, "enable the detection of paste." This typically allows the administrator to define he may or may not want to get paste activity from specific systems (on/off control).

FIG. 9L shows that an administrator can edit or specify details about alert rules. More particularly, in the illustrated implementation, the details (e.g., get a paste alert only if a paste happens inside a specific URL, while using that site) include a rule name ("Exfiltrating data into Gmail"), a short description of the rule ("Exfiltrating data into Gmail"), a category for the rule ("Data Exfiltration"), an operating system (OS) type ("Windows/Mac"), a notification policy, a status (active or inactive) for the alert rule, a risk level (low, medium, or high) for the alert rule, and an alert frequency (e.g., each time the action occurs) for the alert rule.

FIGS. 9M-9Q show a series of screenshots (that may be captured by the system) of a user, through mouse-accessed drop down menus copying text "ObserveIT_Sensitive_Text" from Notepad™ and pasting the text into a Gmail® message, thereby triggering the system to present to the user a pop-up warning on the screen of the user's computer that "According to the company policy you are not allowed to paste information into Gmail." This also prompts the system to create an "Extracting data into Gmail" alert for the administrator of the system.

The agent 220 can be deployed in connection with any one of a variety of different computer platforms, including ones using a Microsoft® Windows operating system, a MAC® platform, a Unix or Linux system, etc. A few examples of how the agent 220 might be deployed on these types of platforms are described below.

The agent 220 may be a software component that can be installed, for example, on any Windows-based operating system (server or desktop) that you want to record. In those implementations, the agent 220 may be a user-mode executable that binds to every user session. As soon as a user logs into a monitored endpoint, the agent 220 begins recording based on a configured recording policy. From the moment a user logs on, the agent 220 starts capturing user activity data logs and, if configured, screen video. In certain implementations, all captured user activity data can be searched for, reported on, configured for alerts, and integrated with security information and event management (STEM) systems. Moreover, in certain implementations, the agent 220 sends all screen capture video and textual activity logs to the monitor application server 210 for processing and storage.

Figure 10:
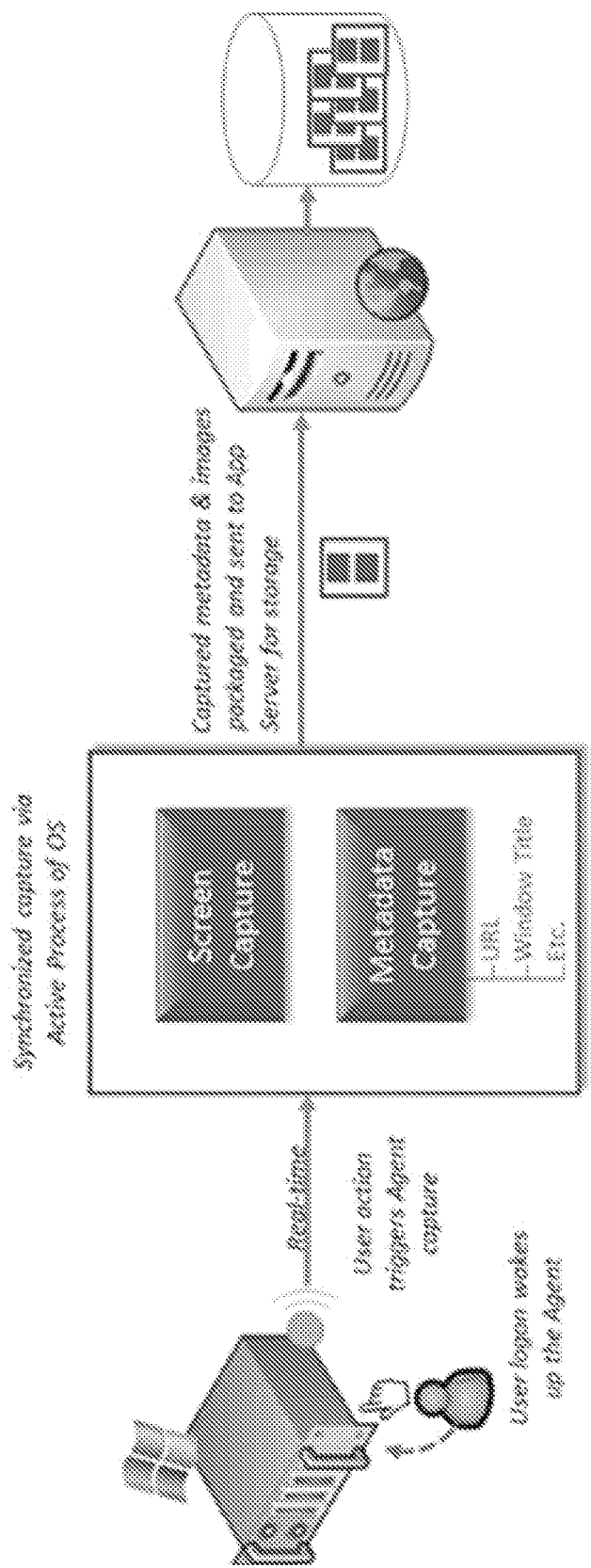
FIGS. 10-12 are schematic representations that show exemplary architectures for deploying an agent in different operating system environments.

FIG. 10 is a schematic representation that shows an exemplary architecture for the agent 220 on a Microsoft® Windows operating system. The figure also provides some details about how the agent operates within the operating system.

According to the illustrated implementation, a user logon wakes up the agent 220. User actions trigger agent captures in real-time. Screenshots and metadata (e.g., uniform resource locators, window titles, etc.) are captured synchronously via active processes of the operating system. The captured metadata and images are packaged and sent to the monitor application server 210 for storage.

The agent 220 is a software component that can be installed, for example, on any Mac® platform (desktop/laptop) requiring monitoring. In an exemplary implementation, all the metadata that is collected from the Mac Agent is searchable, reportable, can be alerted on, and can be exported to STEM systems.

Figure 11:
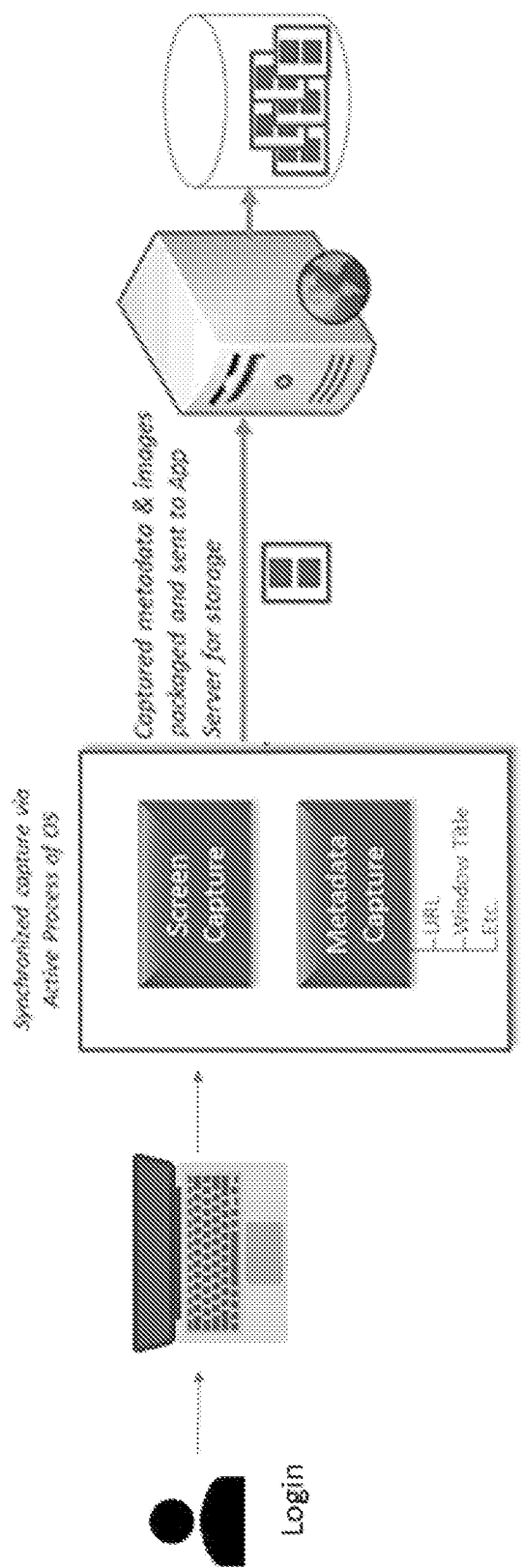

FIG. 11 is a schematic representation that shows an exemplary architecture for the agent 220 on a Mac® platform.

The figure shows a login with screenshots and metadata (e.g., uniform resource locators, window titles, etc.) being captured synchronously via active processes of the operating system. The captured metadata and images are packaged and sent to the monitor application server 210 for storage.

The agent 220 in the illustrated implementation has recording capabilities and supports a number of other features as well. For example, in a typical implementation, the agent 220 monitors the following user actions: mouse clicks, keystrokes, and application changes. In addition, continuous recording may be available.

Moreover, in the illustrated implementation, the system records metadata and stores it in a database, which may be located on a central structured query language (SQL) Server. In some implementations, storage can be on other database types, such as in a cloud data store.

In the illustrated implementation, the agent 220 may be configured to record the following metadata: screenshots (optional), window titles (for the window in focus at the time of the paste), URLs (for Safari, Chrome, TOR, Mozilla Firefox, etc.), application names (for the application in focus, including path), process names (including process IDs), user names (including domain name), keylogging (e.g., keyword and commands), and/or data accesses (e.g., USB connect/file move/file download/file copy/file upload).

Moreover, in the illustrated implementation, the following may be recorded: keylogging, file activity monitoring, alerts, video and metadata recording, configurable recording policies (include/exclude users, applications, or URLs), recording when agent is offline, recording notification message, out-of-policy notifications (warning and blocking messages), log off and close application actions, health monitoring—detect if the Agent is offline or has been tampered with, and/or USB detection.

In the illustrated implementation, the agent 220 is configured to record graphic sessions including: console login, remote/VNC login, fast user switch, and/or screen sharing.

The agent 220 software components can be installed on any supported Unix or Linux system to be monitored.

In some such implementations, the agent 220 may be configured to run in a user mode and be triggered when an interactive session is created on a monitored machine (connected via SSH, Telnet, Rlogin, and so on). It records user activity inside the sessions, including interactive user activity and system functions such as OPEN, EXEC, CHMOD and others. The recorded data is sent to the monitor application server 210 and can be replayed or searched for input commands, system functions and output data. In some such implementations, all recorded data can be searched, reported, configured for alerts, and integrated with SIEM systems.

In some such implementations, when a user logs-in on a Unix/Linux machine (e.g., at 201), the agent 220 is started and begins recording the shell actions based on a predefined (and/or admin-defined) data recording policy.

Figure 12:
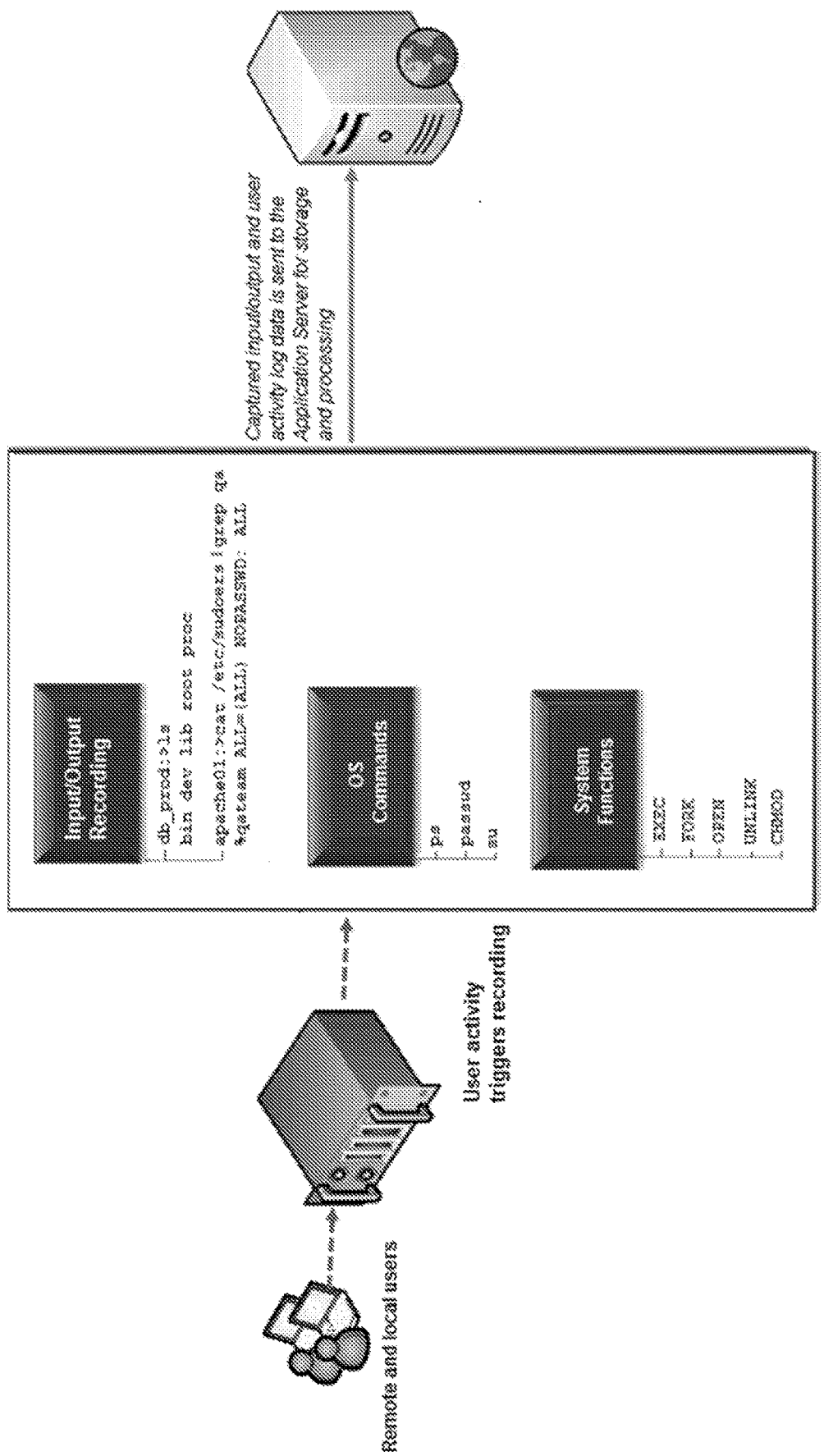

FIG. 12 is a schematic representation that shows an exemplary architecture for an agent 220 on Unix/Linux.

The figure shows remote and local users, with user activity triggering recording. The figure also shows input-output recording, OS commands, and system functions. Captured input/output and user activity log data is sent to the monitor application server 210 for storage and processing.

In some such implementations, the agent 220 may be configured to capture all the internal actions and the names of files and resources that are affected by command line operations. All output, commands and important system functions inside commands may be captured and forwarded to the agent 220, which sends it to the monitor application server 210 for processing and storage.

Moreover, in some such implementations, in an offline mode, the agent 220 may allow local storage of the recorded data in the event of network malfunction or disconnection. When network connectivity is re-established, the locally cached data may be transmitted back to the monitor application server 210. In some implementations, to prevent the local disk from reaching its full capacity, the volume of local data cache may be limited per offline session. Attempting to stop the recording process may result in terminating the user session, preventing any further user activity from not being recorded.

Figure 13:
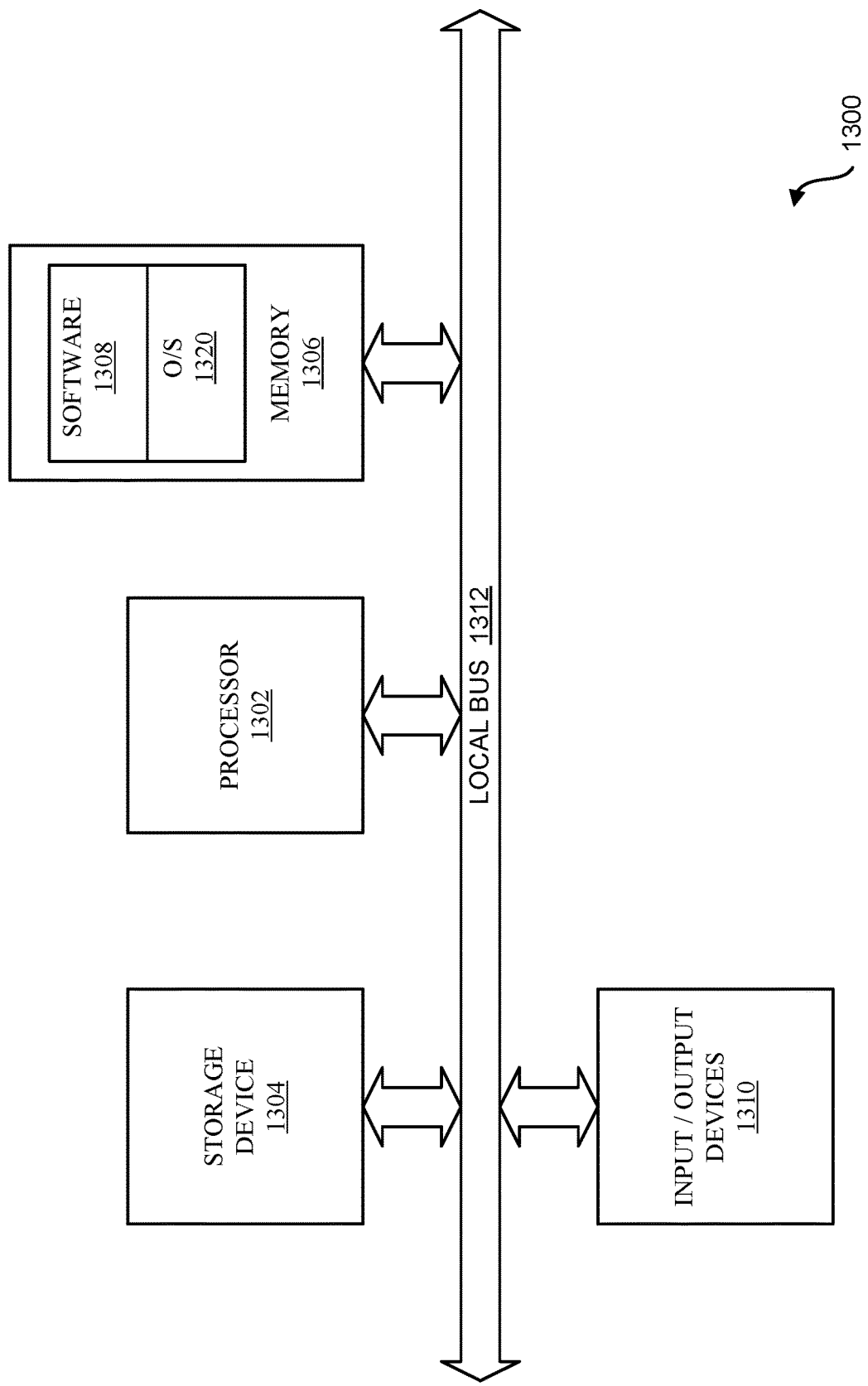
FIG. 13 is a schematic representation of a computer.

The various functionalities described herein (as being attributable to any one or more of the system components) may be performed by a computer (or computer system), an example of which is shown in the schematic diagram of FIG. 13. Variations to the illustrated computer 1300 are, of course, possible. The computer 1300 contains a processor 1302, a storage device 1304, a memory 1306 having software 1308 stored therein that defines the abovementioned functionality, input and output (I/O) devices 1310 (or peripherals), and a local bus, or local interface 1313 allowing for communication within the system 1300. The local interface 1313 can be, for example but not limited to, one or more buses or other wired or wireless connections, as is known in the art. The local interface 1313 may have additional elements, which are omitted for simplicity, such as controllers, buffers (caches), drivers, repeaters, and receivers, to enable communications. Further, the local interface 1313 may include address, control, and/or data connections to enable appropriate communications among the aforementioned components.

The processor 1302 is a hardware device for executing software, particularly that stored in the memory 1306. The processor 1302 can be any custom made or commercially available single core or multi-core processor, a central processing unit (CPU), an auxiliary processor among several processors associated with the present system 1300, a semiconductor based microprocessor (in the form of a microchip or chip set), a macroprocessor, or generally any device for executing software instructions.

The memory 1306 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 1306 may incorporate electronic, magnetic, optical, and/or other types of storage media. Note that the memory 1306 can have a distributed architecture, where various components are situated remotely from one another, but can be accessed by the processor 1302.

The software 1308 defines functionality performed by the system 1300. The software 1308 in the memory 1306 may include one or more separate programs, each of which contains an ordered listing of executable instructions for implementing logical functions of the system 1300, as described below. The memory 1306 may contain an operating system (O/S) 1320. The operating system essentially controls the execution of programs within the system 1300 and provides scheduling, input-output control, file and data management, memory management, and communication control and related services.

The I/O devices 1310 may include input devices, for example but not limited to, a keyboard, mouse, scanner, touchscreen, microphone, etc. Furthermore, the I/O devices 1310 may also include output devices, for example but not limited to, a printer, display, etc. Finally, the I/O devices 1310 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 1300 is in operation, the processor 1302 executes the software 1308 stored within the memory 1306, to communicate data to and from the memory 1306, and to generally control operations of the system 1300 pursuant to the software 1308, as explained herein. The operating system 1320 is read by the processor 1302, perhaps buffered within the processor 1302, and then executed.

When the system 1300 is implemented in software 1308, it should be noted that instructions for implementing the system 1300 can be stored on any computer-readable medium for use by or in connection with any computer-related device, system, or method. Such a computer-readable medium may, in some embodiments, correspond to either or both the memory 1306 or the storage device 1304. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 1302 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 1300 is implemented using hardware, the system 1300 can be implemented with any or a combination of the following technologies: discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

A number of embodiments of the invention have been described. Nevertheless, it will be understood that various modifications may be made without departing from the spirit and scope of the invention.

For example, much of this document focused on detecting a user's paste action—either through a keyboard interaction or through mouse-click interactions. The systems and techniques disclosed herein need not be limited to detecting only paste actions. Instead, in various implementations, the systems and techniques disclosed herein can be broadly applied to detecting any one of a variety of user actions at a computer, whether that action is performed through a keyboard-based interaction or through a mouse-based interaction. Moreover, regardless of the type of user action detected, a notification that may include any one of the types of information mentioned herein as possibly accompanying a paste activity notification may be included with a notification of whatever other activity is being noticed. These can include identifying what the non-paste activity was, who did it, on what machine, in what session, in what process(es), when, etc., etc.

As another example, the particular combinations of keys mentioned here to access the copy ([Cntrl]+[c]), cut ([Cntl]+[x]), and paste ([Cntl]+[v]) are common. However, certain computers and/or applications may provide access to the copy, cut, and paste operations through other combinations of key presses. Moreover, in some instances, a computer or application can be user-configured to provide access to the copy, cut, and paste operations in response to other or different combination of key presses.

As another example, the context menu disclosed and shown herein can vary. For instance, the specific selection of functionalities that can be accessed through the context menu can vary from what has been specifically disclosed herein. Also, the order in which the available functionalities appear within a context menu can vary from implementation to implementation. Additionally, the relative arrangement of functionalities within a particular context menu can vary. For example, the exemplary context menus shown in the figures show a listing of available options that extends from the top of the context menu to the bottom of the context menu. However, the listing could be arranged from side to side, or in an array of some sort.

Moreover, the specific mouse-based actions (e.g., right clicks, left clicks, etc.) and/or keyboard actions (e.g., key presses, etc.) to access, and/or make selections from the context menu may vary from what has been specifically disclosed herein as well.

In some implementations, certain of the methods described herein may be implemented by an agent. The agent may be installed in a host device (for example, a desktop or laptop computer of a user). The agent may be implemented as an extension to the operating system (OS) of its host device. As an OS extension, the agent may leverage existing functionality of the OS via OS application programming interfaces (API), thereby operating in a manner consistent with the designers of the OS that is unlikely to interfere with the normal operations of the host device.

For example, with a MAC operating system, the OS accessibility API 125 provides extensions so user interface devices (for example, keyboards, mouse, trackpads, etc.) may be customized to accommodate users with special needs. This accessibility OS profile provides access to events such as keystrokes, mouse clicks, and other user activities that may be leveraged to monitor usage of the host device. Similar OS hooks are available for other operating systems, such as Windows and the agent may utilize those as well. The agent may be implemented as a background process, such as a daemon, which may be installed by a system administrator in a manner that is invisible and unobtrusive to a user of the host device. Further, unlike a stand-alone application, this background process generally may not be inadvertently (or intentionally) disabled by a user who does not have system administrator privileges.

The agent may be configured to monitor for specific patterns of user activity, and to log and transmit log entries to the remote monitor application server. The remote monitor application server may then catalog the user activity in a database, and/or scan the log entries against a table of rules to determine if the host device is being used in a manner of interest/concern.

In general, it is desirable that the agent and the entire monitor application operate in a largely unobtrusive manner, for example, without noticeably drawing on resources of the host device, such as processing power, storage capacity/throughput, and/or communication bandwidth.

In certain implementations, one or more caching or optimization processes may be utilized to help the system perform the techniques disclosed herein more quickly and efficiently. For example, an optimized detection process may run, and the result returned and sent to cache, which saves the data and/or results of each analysis to be reused, to whatever extent possible, when the same application is later opened with the same context menu. In a typical implementation, this can facilitate faster detection in subsequent detection processes.

In some implementations, fast scans into the clipboard/pasteboard might be performed to retrieve the details of the pasted data, and then those details get analyzed and stored, in an encrypted format, in a safe location under a common general store.

When a keyboard sequence pressed, or the boundary of the paste created in previous steps is being clicked, the system knows a paste action has happened, now it needs the information about what was pasted, so the data is collected from the OS relevant object (e.g., clipboard in windows or pasteboard in MAC). Data could exist before as other listens in the system listen to any new data put in the clipboard/pasteboard. In some instances, data sent to the server, and other data, may be encrypted (since it can contain sensitive data) and saved so later on one can search for it.

There are a variety of ways in which the monitoring application or the agent in the monitoring application might capture information about user activities at a computer. For example, in some implementations, the monitoring application includes a recorder or an OS level listener, such as the global monitor in the MacOS for the key down event to get notifications on pressing a paste combination (for example CMD-V), or system hooks on windows. In addition to keyboard actions (e.g., via a key logger) the listening is also for mouse clicks—both right mouse (opening a context window) and left mouse (e.g., picking the paste action). Moreover, some applications have predefined code to handle their menus to present a paste action option. If an app is one of them, then the monitor application may load the information on the menu from the app.

Any processor(s) described herein can be implemented as one or more than one processor, and any processes described herein can be performed by one or more than one processor. If implemented as more than one processor, the processors can be located in one facility or distributed across multiple locations. Likewise, any memory described herein can be implemented as one or more than one memory device. If implemented as more than one memory device, the memory devices can be located in one facility or distributed across multiple Various aspects of the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to be solely a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

Certain operations described in this specification can be implemented as operations performed by a data processing apparatus (e.g., a processor) on data stored on one or more computer-readable storage devices or received from other sources. The term "processor" (or the like) encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described herein as occurring in a particular order or manner, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In various implementations, a computer-readable medium computer-readable storage medium may include instructions that, when executed by a computer-based processor, cause that processor to perform or facilitate one or more (or all) of the processing and/or other functionalities disclosed herein. The phrase computer-readable medium or computer-readable storage medium is intended to include at least all mediums that are eligible for patent protection, including, for example, non-transitory storage, and, in some instances, to specifically exclude all mediums that are non-statutory in nature to the extent that the exclusion is necessary for a claim that includes the computer-readable (storage) medium to be valid. Some or all of these computer-readable storage media can be non-transitory.

Other implementations are within the scope of the claims.

What is claimed is:

1. A computer-based method comprising:
   receiving, at a computer-based agent on a first computer, an indication from an operating system of the first computer that a user has performed a first action at the first computer that may have caused a context menu with a paste option to open on a screen of the first computer;
   subsequently receiving, at the computer-based agent of the first computer, an indication from the operating system of the first computer that the user has performed a second action at the first computer that may have amounted to a selection of the paste option on the context menu;
   in response to the indication from the operating system of the first computer that the user has performed the second action, determining, with the computer-based agent on the first computer. if the second action by the user amounted to a selection of the paste option on the context menu and thereby caused a paste action to occur;
   applying one or more rules, stored in a server data store, to determine if the selection of the paste option warrants sending an alert notification to a system administrator; and
   in response to determining that the selection of the paste option warrants sending the alert notification to the system administrator based on the applying of the one or more rules, presenting the alert notification at a screen of a second computer indicating that the computer-based agent has determined that the paste action occurred at the first computer, wherein the alert notification identifies the user, a session associated with the selection of the paste option, and an application associated with the selection of the paste option.

2. The computer-based method of claim 1, further comprising:
   creating the alert notification of the paste action after determining that the second action by the user caused the paste action to occur.

3. The computer-based method of claim 1, wherein the first action at the computer is a right mouse click or some other mouse click that the computer responds to by opening the context menu.

4. The computer-based method of claim I, further comprising:
   requesting information, at the computer-based agent, about an open context menu from an accessibility application programming interface (API) on the computer after receiving the indication from the computer's operating system that the user has performed the first action; and receiving information, at the computer-based agent, about an open context menu on the computer from the accessibility API.

5. The computer-based method of claim 4, wherein the information about the open context menu includes information about whether the open context menu has a paste option.

6. The computer-based method of claim 4, further comprising:
obtaining a handle for an in-focus window at the computer from a user interface at the computer before requesting information about the open context menu from the accessibility API,
wherein the in-focus window at the computer is the open context menu.

7. The computer-based method of claim 6, wherein the request for information about the open context menu includes the handle for the in-focus window.

8. The computer-based process of claim 4, wherein the request for information about the open context menu from the accessibility APT includes a request for information that defines an on-screen boundary for a paste option on the open context menu.

9. The computer-based method of claim 8, wherein the second action that the user has performed at the computer is a left mouse click or some other mouse click that will select an option on the context menu if an on-screen pointer or mouse cursor is positioned within an on-screen boundary for that option at the time of the click.

10. The computer-based method of claim 9, wherein the indication from the computer's operating system that the user has performed the second action at the computer comprises information about the on-screen mouse cursor's position at the time of the click.

11. The computer-based method of claim 10, wherein determining if the second user action amounted to a selection of the paste option on the context menu comprises:
comparing the information about the on-screen mouse cursor's position at the time of the click to on-screen boundary for a paste option on the open context menu.

12. The computer-based method of claim 11, further comprising:
concluding that the second user action amounted to a selection of the paste option on the context menu if the on-screen mouse cursor's position at the time of the click was within the on-screen boundary for the paste option on the open context menu.

13. The computer-based method of claim 12, further comprising, in response to concluding that the second user action amounted to a selection of the paste option on the context menu:
collecting data, at the computer-based agent, from the clipboard at the computer; and
including the data collected from the clipboard with the alert notification of the paste action.

14. The computer-based method of claim 12, further comprising, after concluding that the second user action amounted to a selection of the paste option on the context menu:
collecting information about a user session that included the paste action; and/or
collecting information about a process or application in which the paste action occuned; and including the information about the user session and/or the information about the process of application with the alert notification of the paste action.

15. The computer-based method of claim 12, further comprising, after concluding that the second user action amounted to a selection of the paste option on the context menu:
causing the first, computer to capture a screenshot of a screen of the first computer; and
including the screensho with the alert notification.

16. The computer-based method of claim 1, further comprising:
sending a communication from the computer-based agent on the first computer over a network connection to a monitor server.

17. A computer-based method comprising:
receiving, at a computer-based agent on a first computer, an indication from the first computer's operating system that a user has performed a keyboard action at the first computer that included one or more key presses on a keyboard that caused the first computer to perform a keyboard-initiated paste action;
comparing, at the computer-based agent, the one or more key presses against a list of key presses and/or key press combinations, stored in a computer-based data store, that, if pressed, would cause the computer to perform the keyboard-initiated paste action;
in response to the computer-based agent determining that the one or more keys pressed match an entry in the list of key presses and/or key press combinations, then concluding that the keyboard action by the user caused the keyboard-initiated paste action to occur;
applying one or more rules, stored in a server data store, to determine if the keyboard-initiated paste action warrants sending an alert notification to a system administrator; and
in response to determining that the keyboard-initiated paste action warrants sending the alert notification to the system administrator based on the applying of the one or more rules, creating an alert notification of the keyboard-initiated paste action, and presenting the alert notification at a screen of a second computer indicatin that the paste action occurred at the first computer, wherein the alert notification identifies the user, a session associated with the paste action, and an application associated with the paste action.

18. A computer system comprising:
a monitor application server; and
a first computer connected to the monitor application server via a network connection, wherein the first computer comprises: a keyboard, a computer mouse, a screen, an operating system, and a computer-based agent,
wherein the computer-based agent on the first computer is configured to:
receive an indication from the operating system of the first computer that a user has performed a first action with the mouse that may have caused a context menu with a paste option to open on the screen, wherein the first action with the mouse is a right mouse click or some other mouse click that the computer responds to by opening the context menu;
subsequently receive an indication from the operating system that the user has performed a second action with the mouse that may have amounted to a selection of the paste option on the context menu, wherein the second action with the mouse is a left mouse click or some other mouse click that will select an option on the context menu if an on-screen pointer or mouse cursor is positioned within an on-screen boundary for that option at the time of the click; and in response to the indication from the first computer's operating system that the user has performed the second action with the mouse, determine if the second action with the mouse amounted to an actual selection of the paste option on the context menu and thereby caused a paste action to occur;

applying one or more rules, stored in a server data store, to determine if the selection of the paste option warrants sending an alert notification to a system administrator; and in response to determining that the selection of the paste option warrants sending the alert notification to the system administrator based on the applying of the one or more rules, presenting the alert notification at a screen of a second computer indicating that the computer-based agent has determined that the paste action occurred at the first computer, wherein the alert notification identifies the user, a session associated with the selection of the paste option, and an application associated with the selection of the paste option; and a second computer, wherein the system presents the alert notification at a screen of the second computer indicating that the computer-based agent has determined that the paste action occurred at the first computer.

19. The computer system of claim 18, wherein the computer-based agent is configured to:
create a notification of the paste action after determining that the second action by the user caused the paste action to occur.

20. The computer system of claim 18, wherein the computer-based agent is configured to:
obtain a handle for an in-focus window at the computer from the user interface;
request information about an open context menu from an accessibility application programming interface (API) on the computer, where the request to the accessibility API includes the handle for the in-focus window; and
receive information about the open context menu from the accessibility API on the computer.

21. The computer system of claim 20, wherein the information about the open context menu includes information about whether the open context menu has a paste option.

22. The computer system of claim 21, wherein the information about the open context menu defines an on-screen boundary for a paste option on the open context menu.

23. The computer system of claim 22, wherein the indication from the computer's operating system that the user has performed the second action with the mouse includes information about the on-screen pointer or mouse cursor's position at the time of the click, and wherein the computer-based agent determines if the second user action amounted to a selection of the paste option on the context menu by a process that comprises:
comparing the information about the on-screen mouse cursor's position at the time of the click to on-screen boundary for a paste option on the open context menu; and
concluding that the second user action amounted to a selection of the paste option on the context menu if the on-screen mouse cursor's position at the time of the click was within the on-screen boundary for the paste option on the open context menu.

24. The computer-based process of claim 4, wherein the request for information about the open context menu from the accessibility API includes a request for information on the open context menu's location and boundary, the computer-based process further comprising:
in response to the computer-based agent's request for information on the open context menu's location and boundary, returning, from the accessibility API to the computer-based agent, screen coordinates for a left side, a right side, a top side, and a bottom side of the context menu's border.

25. The computer system of claim 20, wherein the request for information about the open context menu from the accessibility API includes a request for information on the open context menu's location and boundary,
wherein the accessibility API returns, in response to the computer-based agent's request for information on the open context menu's location and boundary, screen coordinates for a left side, a right side, a top side, and a bottom side of the context menu's border.

26. The computer-based method of claim 1, wherein applying the one or more rules to determine if the selection of the paste option warrants sending a notification to the system administrator is based on metadata associated with the selection of the paste option.

27. The computer-based method of claim 1, further comprising:
enabling the system administrator to specify the one or more rules.

28. The computer-based method of claim 1, wherein the selection of the paste option occurs in response to an action from a user who is physically- present at the first computer and causes the selection of the past option to occur, and wherein the alert notification is presented at the second computer for the system administrator to review while physically present at the second computer.

29. The computer-based method of claim 1, wherein the alert notification further includes one or more screenshots taken from the first computer associated with the selection of the paste option.

\* \* \* \* \*